United States Patent
Olwal et al.

(10) Patent No.: US 12,271,156 B2
(45) Date of Patent: Apr. 8, 2025

(54) USER INTERFACE VISUALIZATIONS IN A HYBRID SMART WATCH

(71) Applicant: Google LLC, Mountain View, CA (US)

(72) Inventors: Alex Olwal, San Francisco, CA (US); Philip Dam Roadley-Battin, Oakland, CA (US); Tyler Gough, Mill Valley, CA (US)

(73) Assignee: Google LLC, Mountain View, CA (US)

( * ) Notice: Subject to any disclaimer, the term of this patent is extended or adjusted under 35 U.S.C. 154(b) by 857 days.

(21) Appl. No.: 17/474,405

(22) Filed: Sep. 14, 2021

(65) Prior Publication Data
US 2021/0405590 A1 Dec. 30, 2021

Related U.S. Application Data

(63) Continuation of application No. 16/487,541, filed as application No. PCT/US2019/027807 on Apr. 17, 2019, now Pat. No. 11,144,014.
(Continued)

(51) Int. Cl.
*G04C 17/00* (2006.01)
*G04B 47/06* (2006.01)
*G06F 1/16* (2006.01)

(52) U.S. Cl.
CPC ....... *G04C 17/0091* (2013.01); *G04B 47/063* (2013.01); *G06F 1/163* (2013.01)

(58) Field of Classification Search
CPC .... G04C 17/0091; G04B 47/063; G06F 1/163
(Continued)

(56) References Cited

U.S. PATENT DOCUMENTS 6,158,884 A 12/2000 Lebby et al.
9,348,320 B1 * 5/2016 Defazio .............. G04G 9/0064
(Continued)

FOREIGN PATENT DOCUMENTS

CN 205405086 U 7/2016
JP H11052082 A 2/1999
(Continued)

OTHER PUBLICATIONS

Office Action for Chinese Patent Application No. 201980023520.5 dated Jul. 21, 2022. 7 pages.
(Continued)

*Primary Examiner* — Edwin A. Leon
*Assistant Examiner* — Kevin Andrew Johnston
(74) *Attorney, Agent, or Firm* — Lerner David LLP

(57) ABSTRACT

Aspects of the disclosure provide a hybrid smartwatch that incorporates digital technology with an analog timepiece in a wristwatch form factor. A digital display layer of a non-emissive material is configured to present notices, data, content and other information. An analog display layer includes one or more hands of the timepiece, and overlies the digital display layer. The hands may be controlled by a processor through micro-stepper motors or other actuators. Physical motion of the hands is simultaneously coupled with arrangement of content or other elements on the display layer, which results in numerous types of hybrid visualizations. This includes temporal presentations using hourly, daily, monthly or other time scales. Shape-shifting of the watch hands between 2D and 1D arrangements can linearly focus on certain information. And various content-aware layouts can highlight, bracket, occlude or otherwise emphasize or deemphasize displayed information.

15 Claims, 28 Drawing Sheets

Related U.S. Application Data

(60) Provisional application No. 62/661,769, filed on Apr. 24, 2018.

(58) Field of Classification Search
USPC .......................................................... 368/223
See application file for complete search history.

(56) References Cited

U.S. PATENT DOCUMENTS

| | | | |
|---|---|---|---|
| 10,274,904 | B2 | 4/2019 | Minami et al. |
| 2013/0121119 | A1 | 5/2013 | Umamoto |
| 2013/0289419 | A1 | 10/2013 | Berezhnyy et al. |
| 2015/0101412 | A1 | 4/2015 | Poli |
| 2015/0172438 | A1 | 6/2015 | Yang |
| 2016/0054892 | A1 | 2/2016 | Kim et al. |
| 2016/0179353 | A1* | 6/2016 | Iskander ............... G06F 3/0488 715/765 |
| 2016/0306328 | A1* | 10/2016 | Ko ......................... G04C 17/00 |
| 2016/0307567 | A1 | 10/2016 | Boies et al. |
| 2016/0378067 | A1 | 12/2016 | Bishop |
| 2017/0003710 | A1 | 1/2017 | MacWilliams et al. |
| 2017/0082983 | A1 | 3/2017 | Katzer et al. |
| 2017/0115752 | A1 | 4/2017 | Matsuno et al. |
| 2017/0300016 | A1* | 10/2017 | Lider ................... G04G 9/0082 |
| 2018/0074464 | A1* | 3/2018 | Essery ................. G04G 9/0082 |
| 2018/0101142 | A1 | 4/2018 | Dudhat |
| 2018/0164973 | A1 | 6/2018 | Kim et al. |
| 2018/0196397 | A1* | 7/2018 | Clivaz .................... G04G 21/04 |
| 2019/0324404 | A1* | 10/2019 | Olwal ................ G04B 45/0061 |

FOREIGN PATENT DOCUMENTS

| | | |
|---|---|---|
| JP | 2007256062 A | 10/2007 |
| JP | 2008175800 A | 7/2008 |
| JP | 2012032306 A | 2/2012 |
| JP | 2015200624 A | 11/2015 |
| JP | 2016061741 A | 4/2016 |
| JP | 2017083978 A | 5/2017 |

OTHER PUBLICATIONS

Office Action for European Patent Application No. 19722354.8 dated Jun. 13, 2022. 3 pages.
Notice of Allowance for Korean Patent Application No. 10-2020-7030603 dated Nov. 28, 2022. 4 pages.
Office Action for Japanese Patent Application No. 2022-109140 dated Jul. 4, 2023. 4 pages.
Office Action for Japanese Patent Application No. 2020-558611 dated Nov. 2, 2021. 9 pages.
First Examination Report for Indian Patent Application No. 202047039826 dated Dec. 1, 2021. 7 pages.
Office Action for Japanese Patent Application No. 2020-558611 dated Feb. 22, 2022. 6 pages.

* cited by examiner

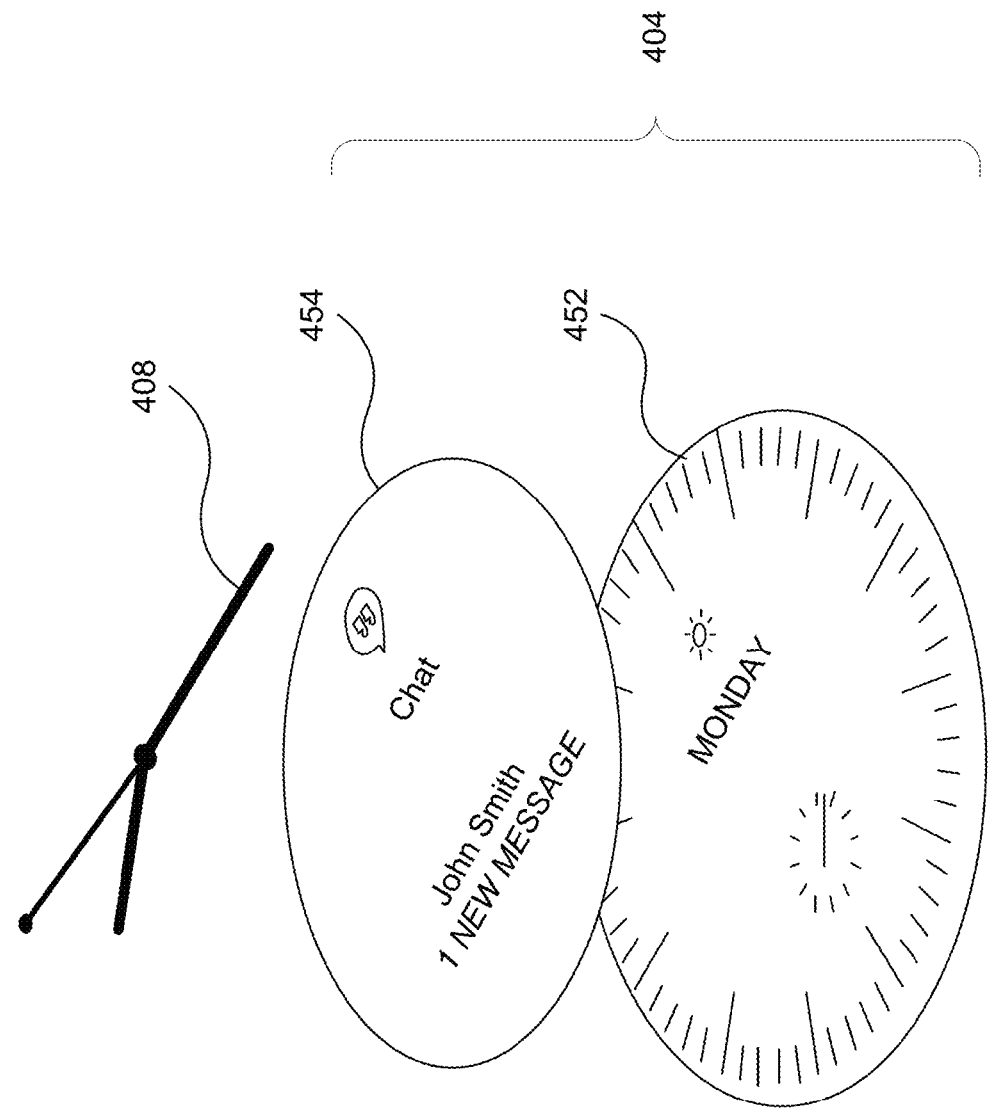

520

510

500

620

610

600

700

710

720

810

800

900

1320

1310

1300

1350

1340

1330

1400

1520

1510

1500

USER INTERFACE VISUALIZATIONS IN A HYBRID SMART WATCH

CROSS-REFERENCE TO RELATED APPLICATIONS

This application is a continuation of U.S. patent application Ser. No. 16/487,541, filed Apr. 17, 2019, which is a national phase entry under 35 U.S.C. § 371 of International Application No. PCT/US2019/027807, filed Apr. 17, 2019, which claims the benefit of the filing date of U.S. Provisional Application No. 62/661,769, filed Apr. 24, 2018, entitled USER INTERFACE VISUALIZATIONS IN A HYBRID SMART WATCH, the disclosures of which are hereby incorporated herein by reference.

BACKGROUND

Personal information technology has rapidly evolved with the introduction of smartphones. Such devices are nearly ubiquitous. It is, however, increasingly challenging to conveniently access and carry smartphones due to expanding sizes and form factors. They can also be distracting to the user and those nearby. Wearable devices with smaller form factors have more recently been used to provide users with activity information, notifications and other functionality in a manner that is more user-friendly and less distracting.

There are different types of wearable devices. One type that is becoming more and more popular is the smartwatch. In addition to telling time, smartwatches may run various apps and or perform in a manner similar to a smartphone. Thus, smartwatches can address the smartphone size issue, and may provide relevant information to a user in a more discreet manner than a smartphone.

BRIEF SUMMARY

Hybrid smartwatches incorporate digital technology with an analog timepiece in a wristwatch form factor. It is possible to treat the graphical display of the digital technology and the mechanical hands of the analog display as separate display surfaces. However, aspects of the disclosure provide hybrid visualizations using both display surfaces to provide creative and efficient types of information to the user (wearer) and to otherwise enhance existing applications. This is done in a way that leverages the strengths and efficiencies of the analog and digital components, while conserving power and extending battery life.

Aspects of the disclosure include a hybrid smartwatch that provides a user interface visualization to a wearer. The hybrid smartwatch comprises a user interface subsystem, a mechanical movement control subsystem, and one or more processors. The user interface subsystem includes a digital graphical display and a mechanical movement having one or more watch hands. The one or more watch hands are arranged along a face of the hybrid smartwatch. The mechanical movement control subsystem is operatively coupled to the one or more watch hands and is configured to adjust the one or more watch hands in one or both of clockwise and counterclockwise directions. The one or more processors are operatively coupled to the digital graphical display and the mechanical movement control subsystem. The one or more processors are configured to select a background visualization and/or one or more notification elements in accordance with a context of the one or more watch hands, generate the background visualization on the graphical display and/or generate the one or more notification elements on the graphical display, for example as an overlay onto the background visualization, and adjust at least one of the background visualization and/or the one or more notification elements based on the context of the one or more watch hands. For example, the background visualization and/or the notification element is arranged relative to a position of the one or more watch hand or relative to a scale (e.g. a time scale) associated with the one or more watch hand.

In one example, the context is a temporal context, the one or more notification elements are temporal notification elements in accordance with the temporal context, and the mechanical movement control subsystem is configured to fast forward the one or more watch hands to a future time in order to align with presentation of the temporal notification elements at the future time. Here, at least one of the temporal notification elements may comprise biometric information.

In another example, the one or more notification elements comprise imagery to indicate a completion status of a task or project. In a further example, the one or more notification elements provide wellness information to a wearer of the hybrid smartwatch. In yet another example, the one or more notification elements and the background visualization provide a focus mode to the wearer of the hybrid smartwatch. In still a further example, the one or more watch hands comprise a plurality of watch hands and the one or more processors are configured to control the mechanical movement control subsystem to adjust the plurality of watch hands between a two dimensional arrangement and a one dimensional arrangement.

In one scenario, the one or more notification elements, the background visualization and the one or more watch hands provide the user interface visualization according to a content-aware hybrid layout. Here, content of the digital graphical display dynamically may change one or more of position, scale or visual quality based on a perceptual goal according to an arrangement of the one or more watch hands. Also, the content-aware hybrid layout may provide a scenario selected from the group consisting of deictic referencing, prioritizing visual contents, prioritizing the one or more watch hands, intentional occlusion of content on the digital graphical display, and appearance fusion through visual blending of elements of the digital graphical display and the one or more watch hands.

Additional aspects of the disclosure include a method of providing a user interface visualization to a user with a hybrid smartwatch. The hybrid smartwatch includes a digital graphical display and one or more physical watch hands arranged along a face of the hybrid smartwatch. The method comprises selecting, by one or more processors, a background visualization and/or one or more notification elements in accordance with a context of the one or more watch hands; generating, by the one or more processors, the background visualization on the graphical display and/or generating, by the one or more processors, the one or more notification elements on the graphical display, for example as an overlay onto the background visualization; and adjusting, by the one or more processors, at least one of the background visualization and/or the one or more notification elements based on the context of the one or more watch hands.

In one example, the context is a temporal context, the one or more notification elements are temporal notification elements in accordance with the temporal context, and the method includes fast forwarding the one or more watch hands to a future time in order to align with presentation of the temporal notification elements at the future time. In this case, at least one of the temporal notification elements may comprise biometric information.

In another example, the one or more notification elements comprise imagery to indicate a completion status of a task or project. In a further example, the one or more notification elements provide wellness information to a wearer of the hybrid smartwatch. In yet another example, the one or more notification elements and the background visualization provide a focus mode to the wearer of the hybrid smartwatch. In still a further example, the one or more watch hands comprise a plurality of watch hands, and the method includes the one or more processors controlling a mechanical movement control subsystem to adjust the plurality of watch hands between a two dimensional arrangement and a one dimensional arrangement. For example, in the one dimensional arrangement, at least two watch hands at least partially or entirely overlap one another. In the two dimensional arrangement, for example, at least two watch hands do not overlap one another (but e.g. are orientated at least partially or entirely obliquely or opposite to one another).

In one scenario, the one or more notification elements, the background visualization and the one or more watch hands provide the user interface visualization according to a content-aware hybrid layout. Here, content of the digital graphical display may dynamically change one or more of position, scale or visual quality based on a perceptual goal according to an arrangement of the one or more watch hands. And the content-aware hybrid layout may provide a scenario selected from the group consisting of deictic referencing, prioritizing visual contents, prioritizing the one or more watch hands, intentional occlusion of content on the digital graphical display, and appearance fusion through visual blending of elements of the digital graphical display and the one or more watch hands.

BRIEF DESCRIPTION OF THE DRAWINGS

FIG. 4B illustrates a notification overlay on a hybrid smartwatch in accordance with aspects of the disclosure.

DETAILED DESCRIPTION

Overview

The analog and digital display elements in a hybrid smartwatch as discussed herein provide a rich graphical interface in a wearable form factor. Programmable materials are utilized in conjunction with electromechanical control of the watch hands. The programmable materials may include electronic ink (E-ink) pigments or other non-emissive arrangements that are capable of displaying dynamic patterns. A mechanical movement control manages positioning of the watch hands. For instance, micro-stepper motors provide control, positioning and mechanical expressivity via resulting hand movement. While these servo-controlled hands are overlaid on a graphical display, the system coordinates the analog and digital displays to share responsibilities for the user interface. A wide variety of user interface visualizations can be achieved with this type of hybrid smartwatch configuration.

Example System

Figure 1:
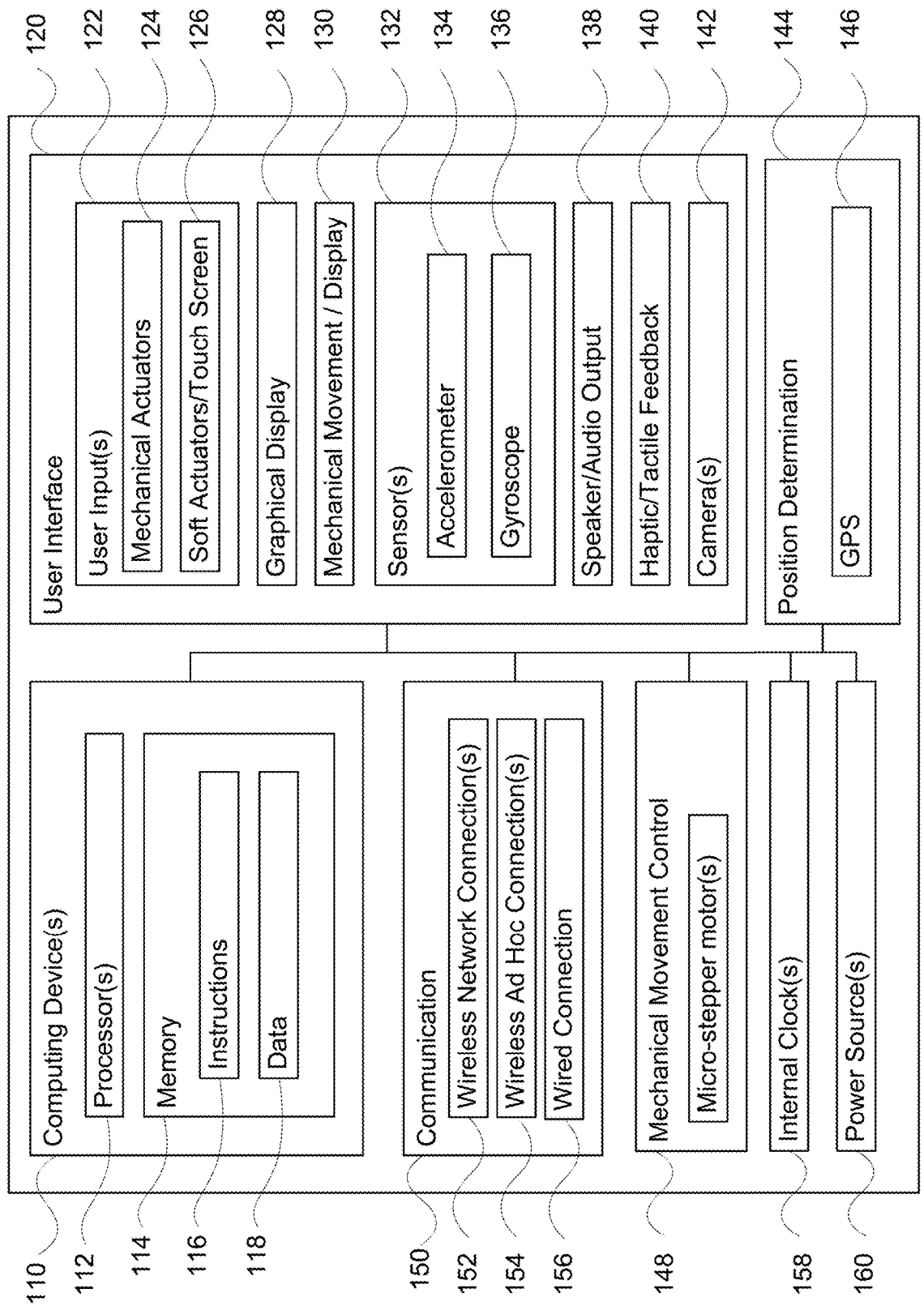
FIG. 1 is a functional diagram of an example hybrid smartwatch in accordance with aspects of the disclosure.

As shown in FIG. 1, a hybrid smartwatch 100 in accordance with one aspect of the disclosure includes various components. The hybrid smartwatch may have one or more computing devices, such as computing device 110 containing one or more processors 112, memory 114 and other components typically present in a smartphone or other personal computing device. The one or more processors 112 may be processors such as commercially available CPUs. Alternatively, the one or more processors may be a dedicated device such as an ASIC, a single or multi-core controller, or other hardware-based processor.

The memory 114 stores information accessible by the one or more processors 112, including instructions 116 and data 118 that may be executed or otherwise used by each processor 112. The memory 114 may be, e.g., a solid state memory or other type of non-transitory memory capable of storing information accessible by the processor(s), including write-capable and/or read-only memories.

The instructions 116 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in detail below.

The data 118 may be retrieved, stored or modified by processor 112 in accordance with the instructions 116. As an example, data 118 of memory 114 may store predefined scenarios. A given scenario may identify a set of scenario requirements including visual effect types, content to be presented and predefined interactions between the watch hands and the graphical display. For instance, particular movements of the watch hands in combination with selected notification types may be included in the predefined scenarios.

User interface 120 includes various I/O elements. For instance, one or more user inputs 122 such as mechanical actuators 124 and/or soft actuators 126 are provided. The mechanical actuators 124 may include a crown, buttons, switches and other components. The soft actuators 126 may be incorporated into a touchscreen cover, e.g., a resistive or capacitive touch screen.

As noted above, one aspect of the technology is the use of analog watch elements enhanced with digital capabilities and connectivity. Thus, both a digital graphical display 128 and a mechanical movement (analog display) 130 are provided in the user interface 120 of the hybrid smartwatch 100. The digital graphical display 128 may be an E-ink or other type of electrophoretic display. Alternatively, other non-emissive arrangements or even emissive displays may be employed. The mechanical movement 130 includes hour and minute hands. A seconds hand and/or other hand indicators may also be employed.

Figure 2:
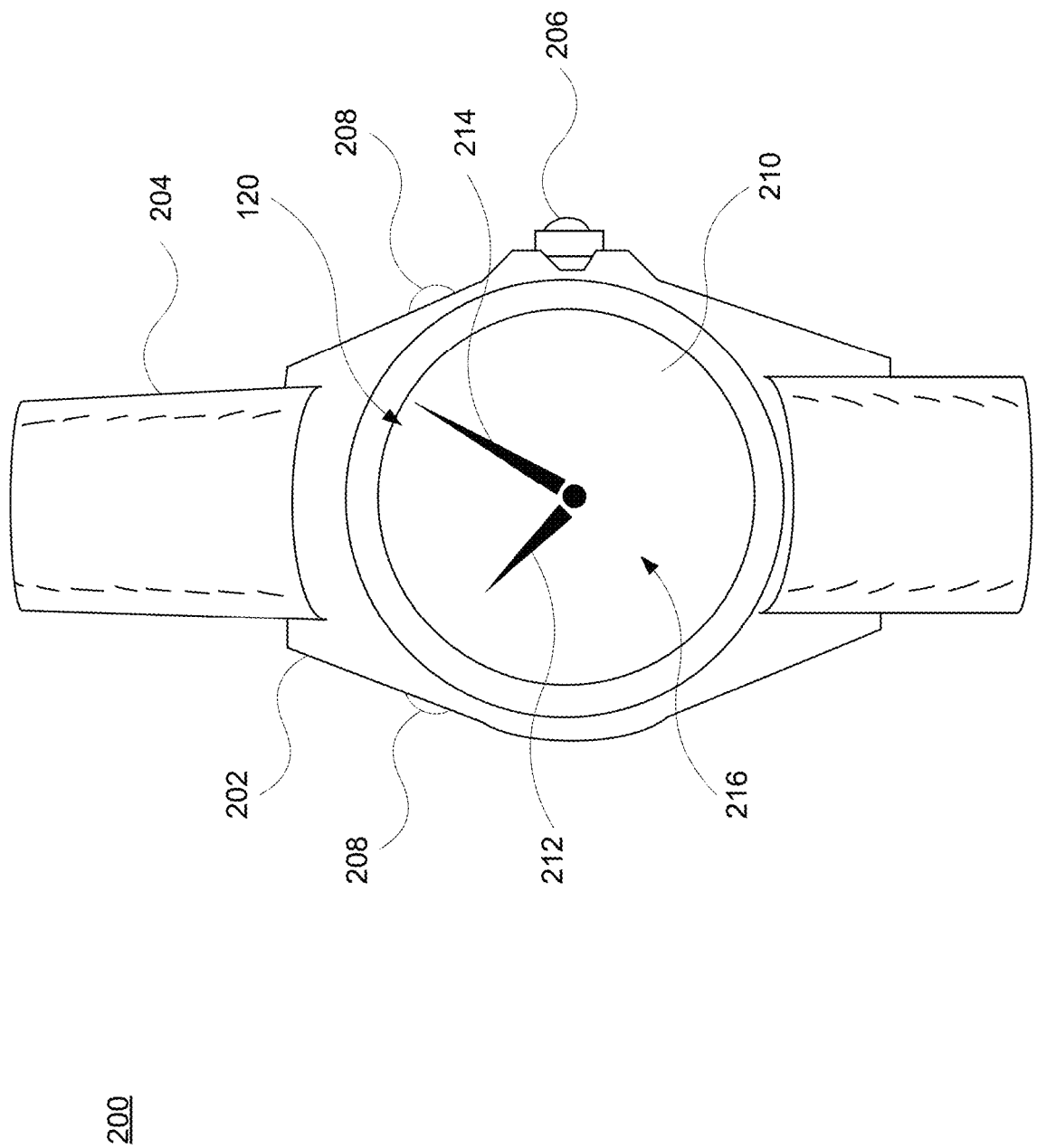
FIG. 2 illustrates an example hybrid smartwatch in accordance with aspects of the disclosure.

An example watch configuration 200 with such a user interface 120 is shown in FIG. 2. The example watch configuration 200 includes a watch housing 202 and a band 204 connected thereto. The mechanical actuators here include crown 206 and a pair of supplemental buttons 208. The number of mechanical actuators may vary, and may be more or less than the number shown. Actuators may be located on the band 204 in addition to or in place of actuators on the watch housing 202. In fact, in some instances there may be no mechanical actuators on the watch housing 202 or the band 204. One or more soft actuators may be incorporated into cover 210. Under the cover 210 are an hour hand 212 and a minute hand 214. Depending on the analog watch functionality, one or more additional hand indicators, e.g., a seconds hand or an alarm hand, may also be used. Or, alternatively, the watch style may dictate a watch having only one hand. In this example, the user interface 120 includes a circular graphical display 216. However, the graphical display 216 may have a different shape or size depending on the configuration of the watch housing 202. For instance, the graphical display 216 may be square, rectangular, octagonal or a different geometric shape.

Returning to FIG. 1, the user interface 120 may include additional components as well. By way of example, one or more sensors 132 may be located on or within the watch housing. The sensors may include an accelerometer 134, e.g., a 3-axis accelerometer, and/or a gyroscope 136. Other sensors may include a magnetometer, a barometric pressure sensor, an ambient temperature sensor, a skin temperature sensor, a heart rate monitor, an oximetry sensor to measure blood oxygen levels, and a galvanic skin response sensor to determine exertion levels. Additional or different sensors may also be employed.

The user interface 120 may also include one or more speakers, transducers or other audio outputs 138. A haptic interface or other tactile feedback 140 is used to provide non-visual and non-audible information to the wearer. And one or more cameras 142 can be included on the housing, band or incorporated into the display.

The hybrid smartwatch 100 also includes a position determination module 144, which may include a GPS chipset 146 or other positioning system components. Information from the accelerometer 134, gyroscope 136 and/or from data received or determined from remote devices (e.g., wireless base stations or wireless access points), can be employed by the position determination module 144 to calculate or otherwise estimate the physical location of the hybrid smartwatch 100.

In order to obtain information from and send information to remote devices, the hybrid smartwatch 100 may include a communication subsystem 150 having a wireless network connection module 152, a wireless ad hoc connection module 154, and/or a wired connection module 156. While not shown, the communication subsystem 150 has a baseband section for processing data and a transceiver section for transmitting data to and receiving data from the remote devices. The transceiver may operate at RF frequencies via one or more antennae. The wireless network connection module 152 may be configured to support communication via cellular, LTE, 4G and other networked architectures. The wireless ad hoc connection module 154 may be configured to support Bluetooth®, Bluetooth LE, near field communications, and other non-networked wireless arrangements. And the wired connection module 156 may include a USB, micro USB, USB type C or other connector, for example to receive data and/or power from a laptop, tablet, smartphone or other device.

Figure 3:
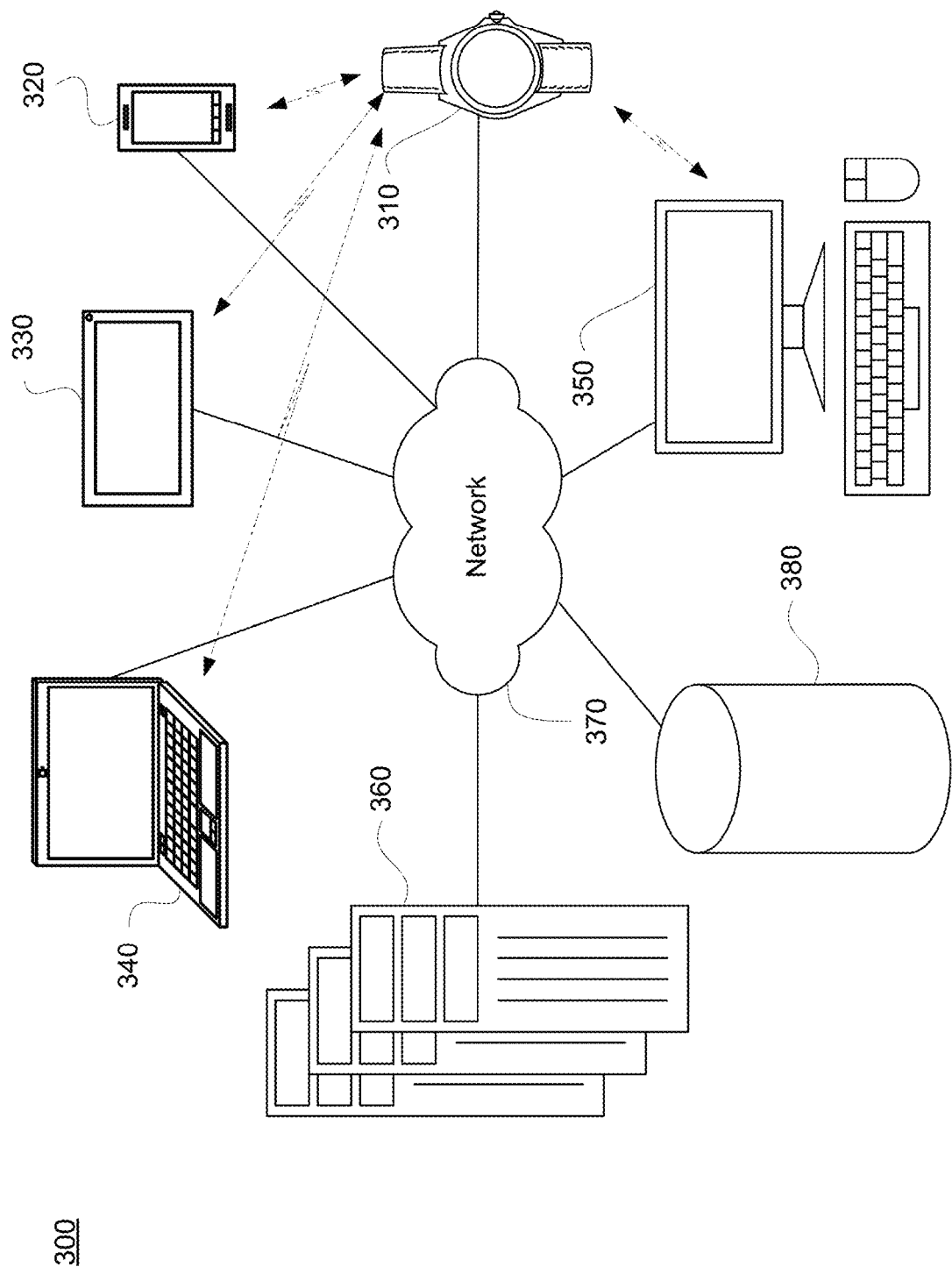
FIG. 3 is an example pictorial diagram of a networked or ad hoc system in accordance with aspects of the disclosure.

FIG. 3 is a pictorial diagram of an example system 300 that includes one or more hybrid smartwatches 310 or other wearable personal devices, as well as remote user devices such as smartphone 320, tablet computer 330, laptop computer 340, desktop PC 350 and a remote server system 360 connected via a network 370. System 300 may also include one or more databases 380, which may be operatively associated with the server system 360. Although only a few devices are depicted for simplicity, the system 300 may include significantly more. Each client device and the server system may include one or more processors, memory, data and instructions. Such processors, memories, data and instructions may be configured similarly to one or more processors, memory, data, and instructions of computing device 110. The hybrid smartwatch(es) 310 may also communicate directly with smartphone 320, tablet computer 330, laptop computer 340 and/or desktop PC 350, for instance via an ad-hoc arrangement or wired link, as shown by the dash-dot arrows. The hybrid smartwatch(es) may obtain data, instructions, apps or other information from any of the remote devices, and may use such information when communicating with the user via the user interface of the watch. For instance, an app on smartphone 320, tablet 330 or laptop 340 may provide information to or control what is presented to the user on the hybrid smartwatch 310. This can include email, calendar or other content.

Returning to FIG. 1, the hybrid smartwatch 100 includes a mechanical movement control 148 to manage the positioning and movement of the watch hands of the analog display. One or more internal clocks 158 providing timing information, which can be used for timekeeping with the watch hands, time measurement for apps and other programs run by the smartwatch, and basic operations by the computing device(s) 110, GPS chipset 146 and communication subsystem 150. And one or more power source(s) 160 provide power to the various components of the smartwatch. The power source(s) may include a battery, winding mechanism, solar cell or combination thereof. The computing devices may be operatively coupled to the other subsystems and components via a wired bus or other link, including wireless links.

Figure 4A:
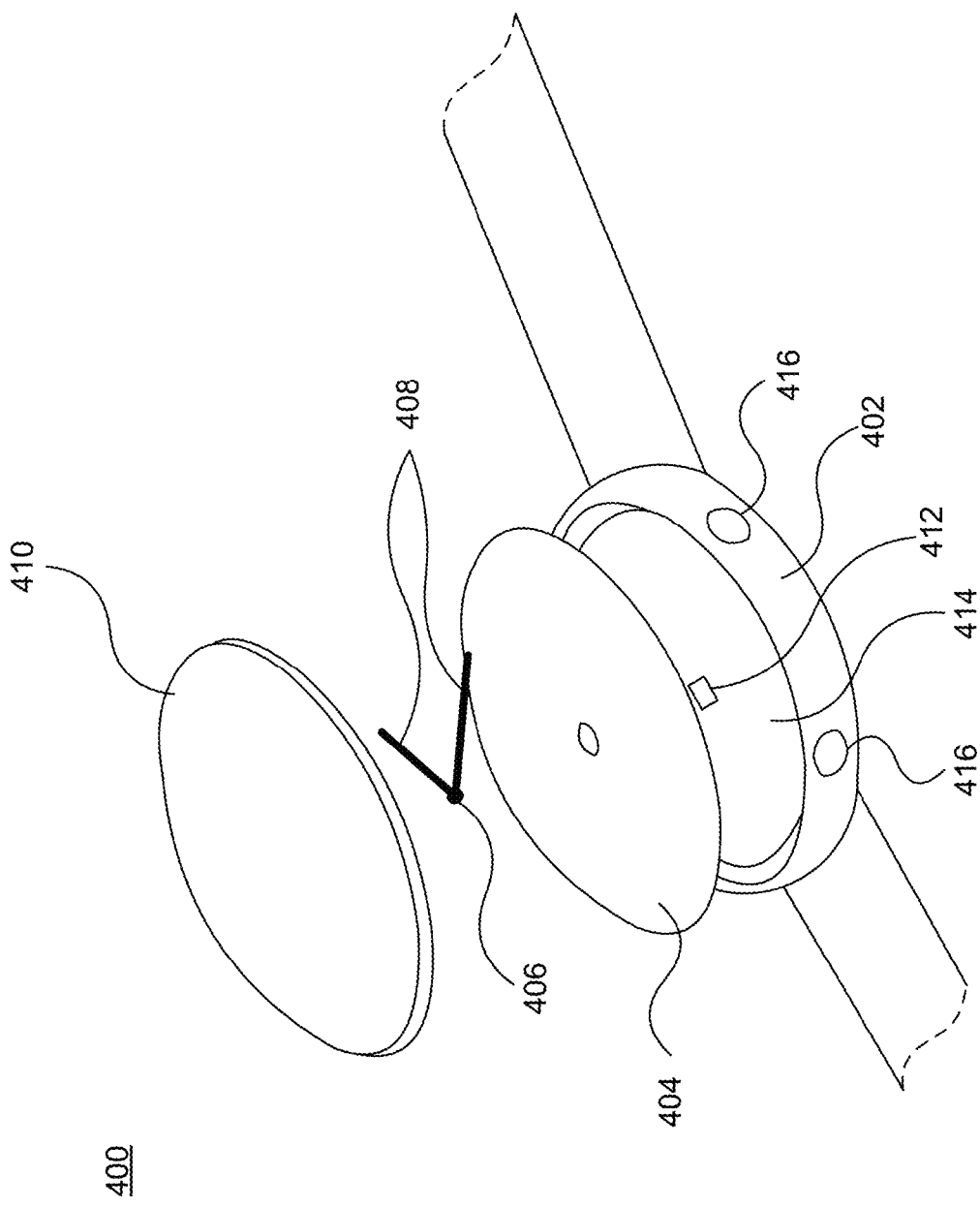
FIG. 4A illustrates a component view of a hybrid smartwatch in accordance with aspects of the disclosure.

FIG. 4A is an exploded view of an example smartwatch 400 in accordance with aspects of the disclosure. As shown, the housing 402 is arranged to receive a graphical display 404, a mechanical movement component 406, one or more watch hands 408 coupled to the mechanical movement component 406, and a cover 410, such as a transparent glass or plastic cover. The mechanical movement control may include one or more micro-stepper motors or another actuation mechanism 412 disposed on a printed circuit board (PCB) 414. A spacer element (not shown) may be arranged between the PCB 414 and the graphical display 404. One or more mechanical actuators, e.g., tactile buttons 416, are disposed on the housing 402 and operatively coupled to the PCB 414.

As noted above, the micro-stepper motors or other actuation mechanism(s) 412 are configured to provide control, positioning and mechanical expressivity via resulting hand movement, for instance by causing the one or more hands to rotate or otherwise adjust in a predetermined manner. The micro-stepper motors enable unidirectional or bidirectional rotation of the hands (clockwise and/or counterclockwise) through electrical pulses that may be controlled by the one or more processors 112 of FIG. 1. While the micro-stepper motors or other actuation mechanism 412 are shown as being mounted to the PCB, they may be affixed to a different substrate or component, or may be otherwise secured to the housing 402.

According to one scenario, the electrical pulses have a pulse width on the order of 2 ms, for instance between about 1.75-2.25 ms. Here, the minute and hour hands may have a rotational speed on the order of 120 steps per revolution, although the number of steps for each hand may vary. In other examples, the pulse widths and steps per revolution may vary, e.g., by +/−10%, or more or less. In some scenarios, the steps are related to the application. For instance, time-related apps may have a 60 step resolution, while other apps may employ a higher (or lower) number of steps. And the pulse width may vary based on motor characteristics of the actuator(s). The timing and duration of the pulses and steps is controlled, for example, by the one or more processors 112 of FIG. 1. The ability to mechanically configure the position of the hands enables the system to adapt the user interface along several dimensions. Should the micro-stepper motors fall out of sync with one another, this can be detected by encoders and/or sensors in the housing and corrected by the processing system.

The graphical display includes, in this scenario, a non-emissive display. The non-emissive display is bi-stable, which does not require power to maintain the displayed information. The non-emissive display may be arranged as a circle or other shape depending on the overall appearance of the smartwatch. Nonetheless, the display includes a central opening adapted to receive the mechanical movement component 406 of FIG. 4A. Depending on the size and shape of the display, different resolutions and colors or greyscales may be employed. For instance, the resolution may be 180×180, 240×240, 960×540, 1448×1072, 1200×1600, or higher or lower. The bit depth may be, e.g., 1-bit, 2-bit, 4-bit or more. If greyscale is used instead of a color palette, the greyscale may be, e.g., black and white, 4 greyscales, 16 greyscales or more or less. Alternatively, multi-color or full color displays of, e.g., 6-bit 8-bit or 16-bit or more may be employed. Such color displays may include active matrix LED (AMOLED), passive matrix LED (PMOLED), LCDs such as TFT LCDs, and transflective displays.

FIG. 4B illustrates an example 450 of notification overlay. The watch hand(s) 408 are disposed above the graphical display 404, as in FIG. 4A. As shown here, an active graphical watch face is illustrated as being presented in a background 452 of the graphical display, with one or more notifications being presented in an overlay 454 of the graphical display. For instance, the system may identify or keep track of a queue of notifications. An alert-type notification may be injected into the top of the notification queue for presentation on the overlay portion of the graphical display. When multiple alerts or other notifications are present, they can be cycled through like different watch faces. They may be dismissed by, e.g., tapping the glass or plastic cover, pressing one of the buttons or other actuators, making a particular gesture, or by looking at a particular portion of the graphical display or looking away from the display.

Figure 5C:
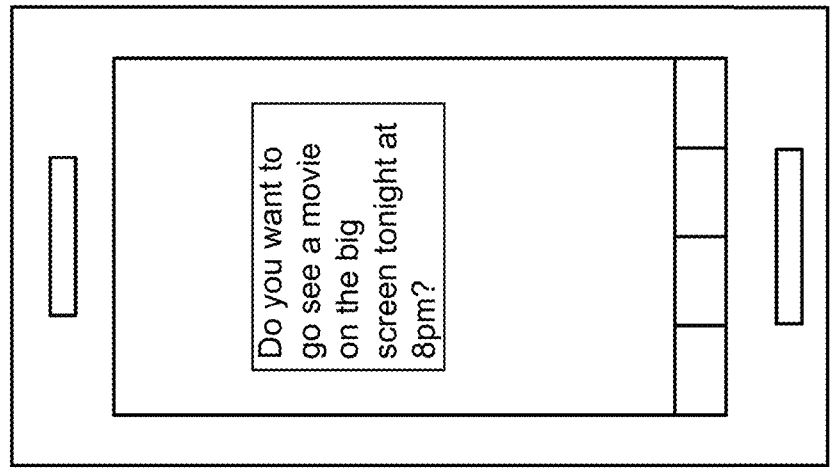
FIGS. 5A-5C illustrates an example of notification escalation in accordance with aspects of the disclosure.
Figure 5B:
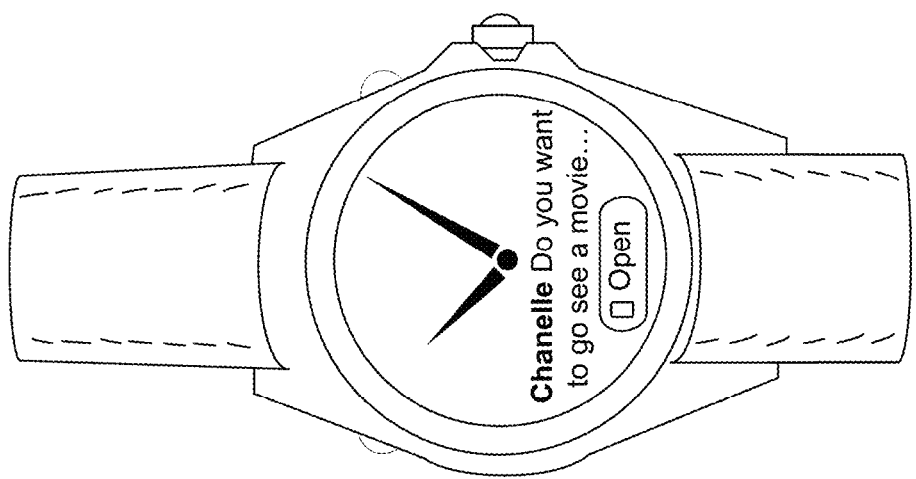
Figure 5A:
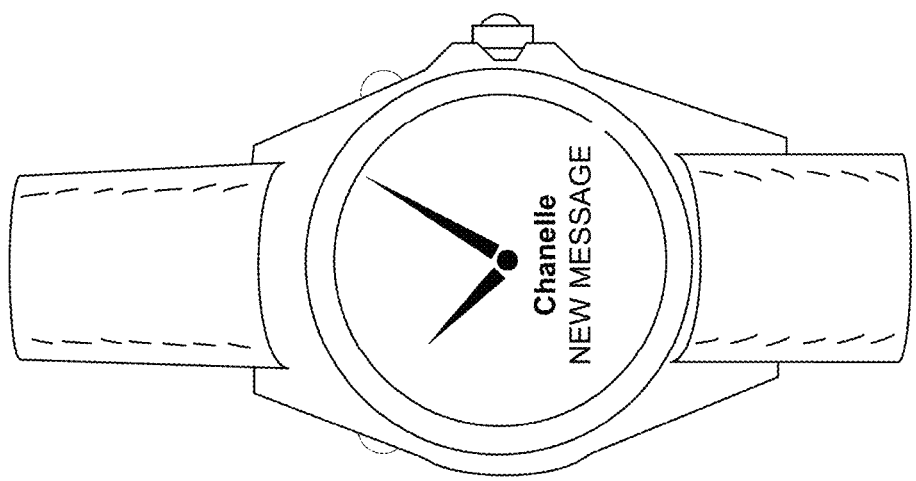

A camera or sensor, such as a gyroscope or accelerometer, may be used to determine whether the user is interested in a particular item of content, such as a given notification. FIGS. 5A-C illustrate one way that content may be presented to the user. As shown in FIG. 5A, the watch display may provide a "peek" view 500 of a new message. This may occur when the user glances at the watch, and the trigger could be a rotation of the wrist as detected by an accelerometer or gyroscope. Then, in FIG. 5B a camera on the watch may detect that the user has continued looking at the watch face for at least a predetermined period of time. This may be, e.g., 1-2 seconds, at least 3 seconds, no more than 5 seconds, etc. Here, a "message detail" view 510 is provided. The message detail view can include a first line or two of the message, a selected portion of the message, or up to a maximum number of characters. Then, if the wearer continues to look at the message detail for a further period of time or take some other action, such as make a gesture, tap the watch face, push the crown button or another actuator, or the like, then the watch may link to another client device such as the wearer's cell phone, tablet or laptop computer, as shown in FIG. 5C. Here, as illustrated in the "deep link" view 520, all or additional portions of the message or other content are provided to the wearer on the other client device. This may be done, as discussed above in relation to FIG. 3, via a direct or indirect wireless link to the other client device. There are other ways to present expanded notifications and other types of information, which are discussed in detail below.

Example Scenarios

The control and interplay of the pixels of the display and the positioning of the hands is performed cooperatively to create hybrid user interfaces visualizations for different scenarios. For example, various types of information may be presented according to predetermined criteria, which can vary with different interactions, applications and user preferences. One set of scenarios involves displaying information according to different dimensions and/or scales along the (circular) watch face. These scenarios include, but are not limited to time (temporal) scales, past or future events, time-based semantic information, location information, and the like.

Time Scales, Event Tracking, and Health/Wellness Scenarios

The user interface is able to reconfigure to adapt the presentation to different scales, presented as relative visualizations to the physical watch hand(s). Time scales along the graphical display may include, e.g., 12 or 24 hours, 60 minute, 60 seconds and the like. They may also include days of the week, for instance in a 5-day (workweek), 2-day (weekend) or 7-day (full week) format. Another time scale may be the months of the year, e.g., 12 months arranged around the watch face. The time scale may also include days in a month (e.g., 28, 29, 30 or 31), days in a year (e.g., 365), or other variations such as a fortnight, bi-monthly configuration, quarter, etc.

The system may shift time scales from one arrangement to another depending on the calendar used, such as solar, lunar, lunisolar, etc. Programmatic control, for instance by the one or more system processors, also permit the presentation of cylindrical or irregular calendars that are meaningful to users. The calendar may be related to health (e.g., pregnancy term, medication reminders, appointments), recurring tasks (e.g., bill payments, work or school meetings, child daycare pickup), religion (e.g., prayer calendar, holidays), and other periodic or non-periodic events.

Figure 6C:
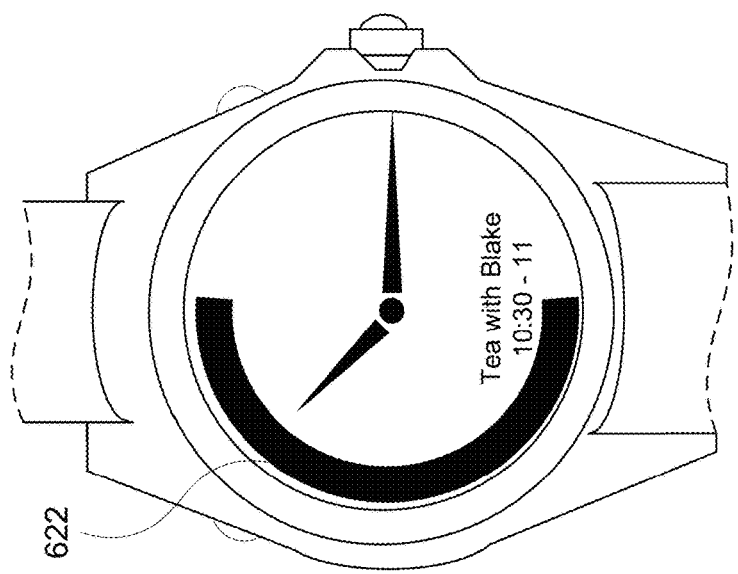
FIGS. 6A-6C illustrate an example of calendar visualization in accordance with aspects of the disclosure.
Figure 6B:
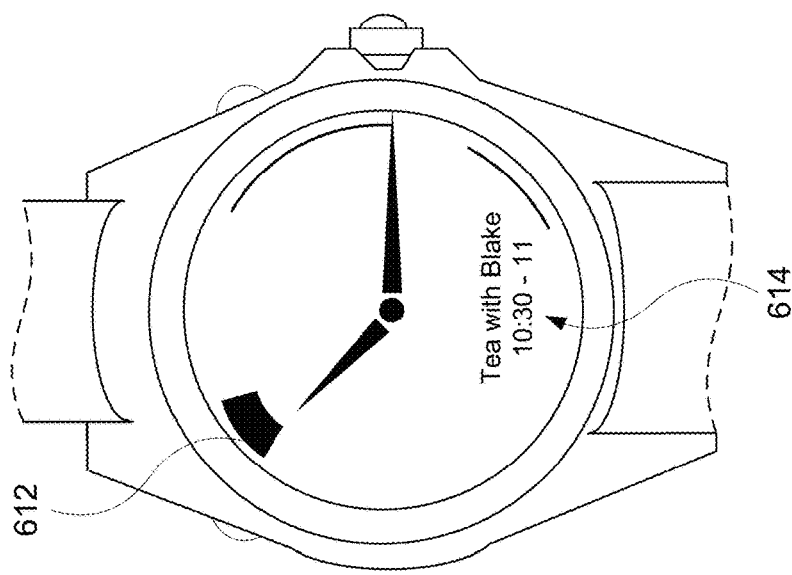
Figure 6A:
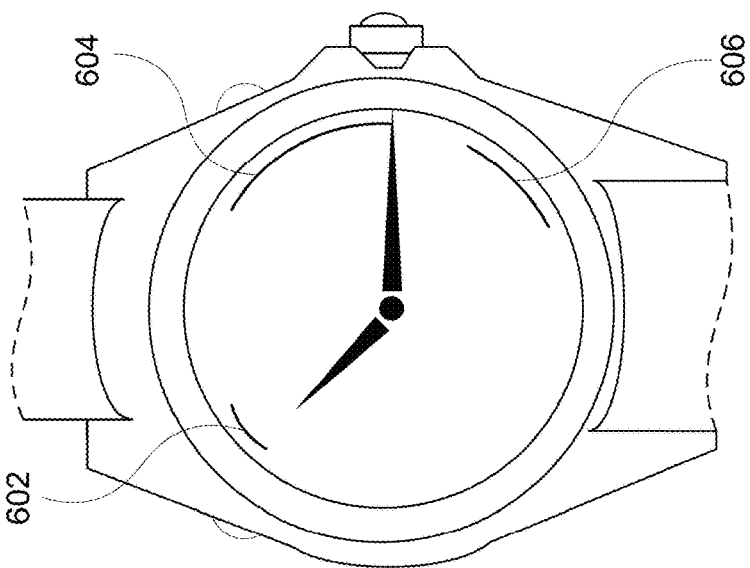

FIGS. 6A-6C provide an example of how a calendar may be used to visualize future events relative to the position of the physical hands. FIG. 6A shows a first arrangement 600 with several events 602, 604 and 606 visualized with arcs (notification elements) on a 12-hour time scale. This is a "collapsed" view in which the arcs are presented without other contextual information. FIG. 6B shows a second arrangement 610, also on a 12-hour time scale (relative to the hour hand). Here, event 602 has been "expanded" as shown by the thicker arc 612. Corresponding to this event is a notification 614 with text (or other information) that is also provided on the graphical display. The notification may be presented as part of an overlay to the graphical display as discussed above. In this situation, the other events may remain in collapsed form as shown. FIG. 6C illustrates the same event 602, but displayed with a 60-minute view (relative to the minute hand). In this third arrangement 620, the arc 612 from FIG. 6B is extended in accordance with the 60-minute time scale, as shown by arc 622. In this case, the notification remains, but the other events are omitted as they do not fall within the presented time range. The user may toggle between the different arrangements 600, 610 and 620 or select one of the events by, for instance, pressing the crown button or other mechanical actuator on the watch housing. Alternatively, the wearer may press a soft actuator on the display or otherwise tap, press or touch on the cover. Or the wearer may make a gesture with a hand or look at the watch face with one or both eyes open for a certain amount of time to cause the toggle or selection.

Figure 7A:
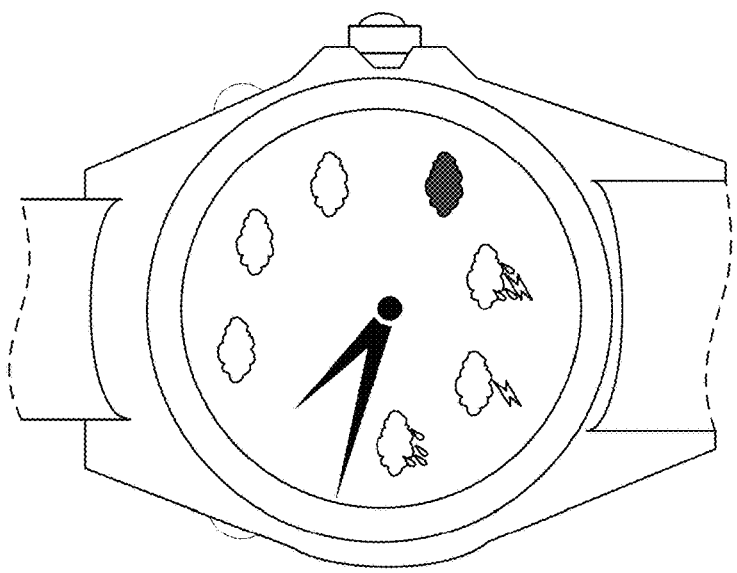
FIGS. 7A-7I illustrates exemplary temporal features in accordance with aspects of the disclosure.
Figure 7B:
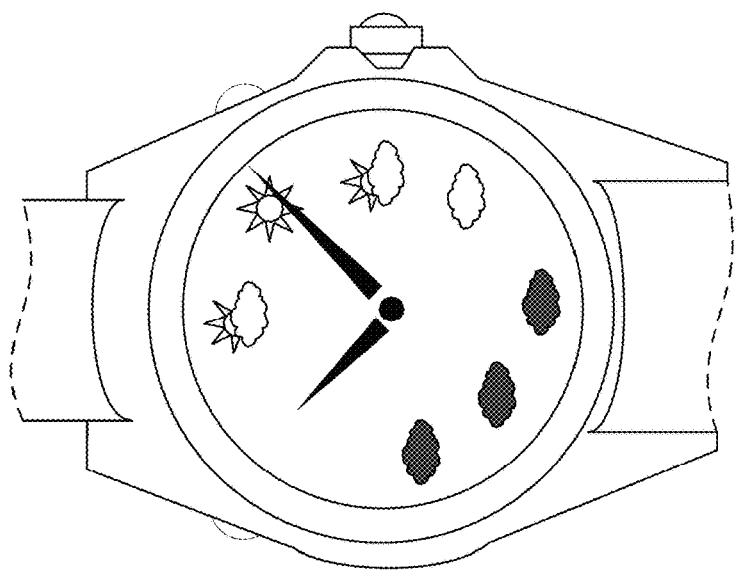
Figure 7C:
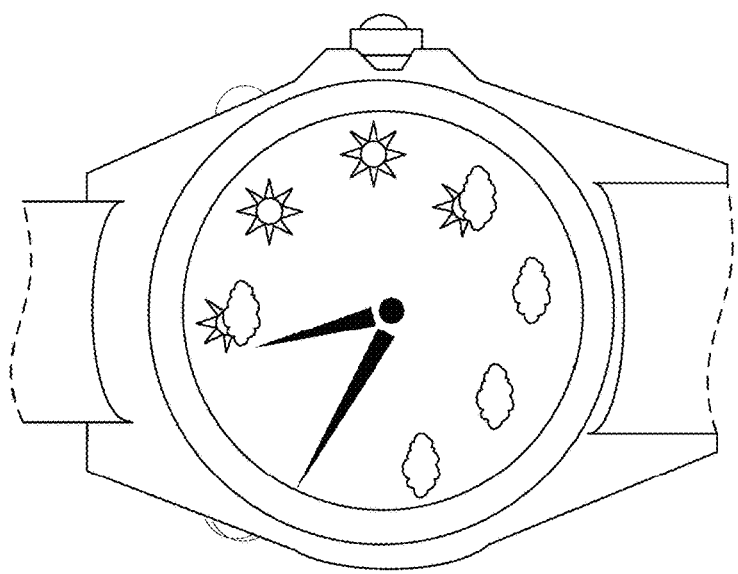
Figure 7F:
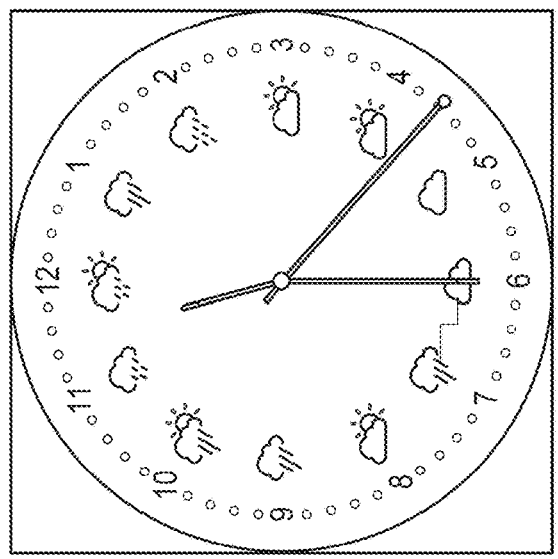
Figure 7E:
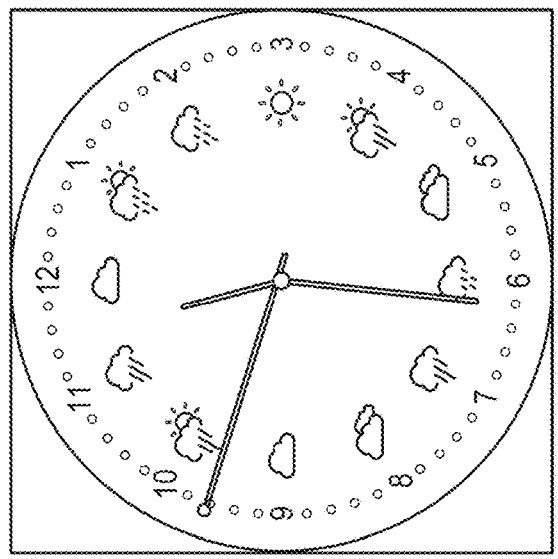
Figure 7D:
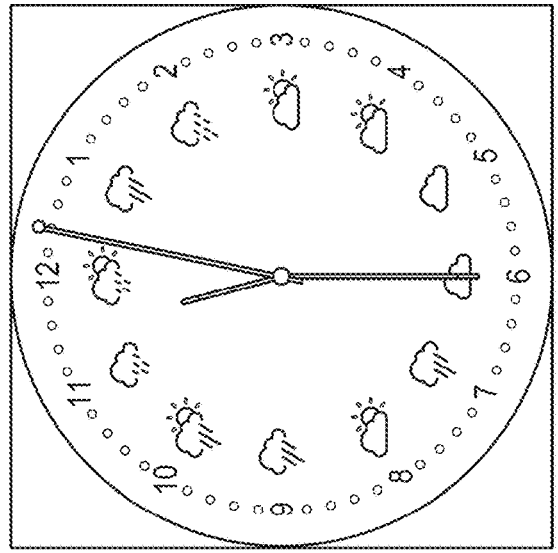
Figure 7I:
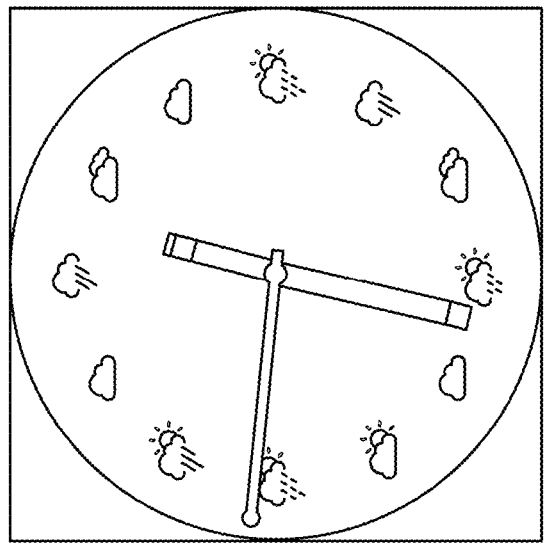
Figure 7H:
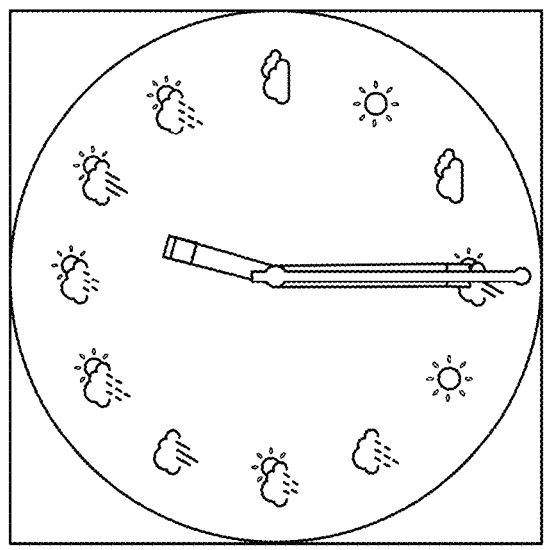
Figure 7G:
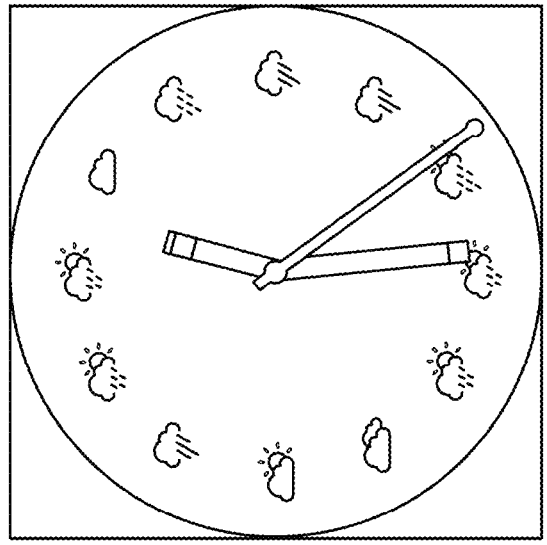

FIGS. 7A-7C provide examples 700, 710 and 720 of displaying information over a past, present or future time. The information may be relative to the position of the physical hands, which serves as an indication of the current time. In these examples, a dynamic weather forecast is displayed and updated. Here, the wearer may easily see the weather at the current time and at some other time. The weather may be updated periodically, e.g., every 5, 10, 15 or 30 minutes, or more or less. FIGS. 7D-7F illustrate another example 730 showing the weather and a clock face, in addition to hour, minute and second hands. Here, the weather may be updated more or less frequently than in the above example, for instance every time the minute hand makes a full rotation. FIGS. 7G-7I illustrate a similar example 740, except here the numbers of the clock face are omitted. In such examples, the forecast is for a specific timescale. For instance, the weather may be shown for every future hour on a 12-hour timescale (FIGS. 7D-7F). Or the forecast may only be shown when the weather changes, such as may occur as illustrated in FIGS. 7A-7C. Aspects of the technology may employ different strategies to select the timescales and intervals, e.g., for updates.

Figure 8B:
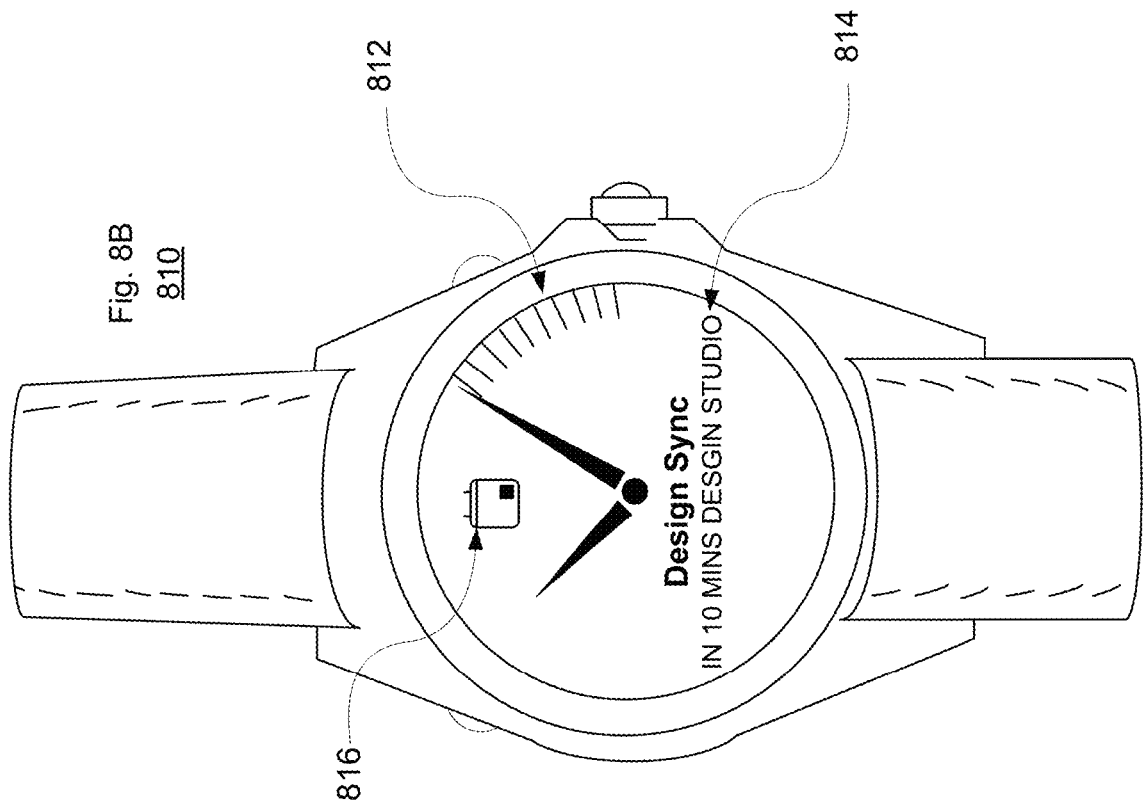
FIG. 8A-8D illustrate additional temporal features in accordance with aspects of the disclosure.
Figure 8A:
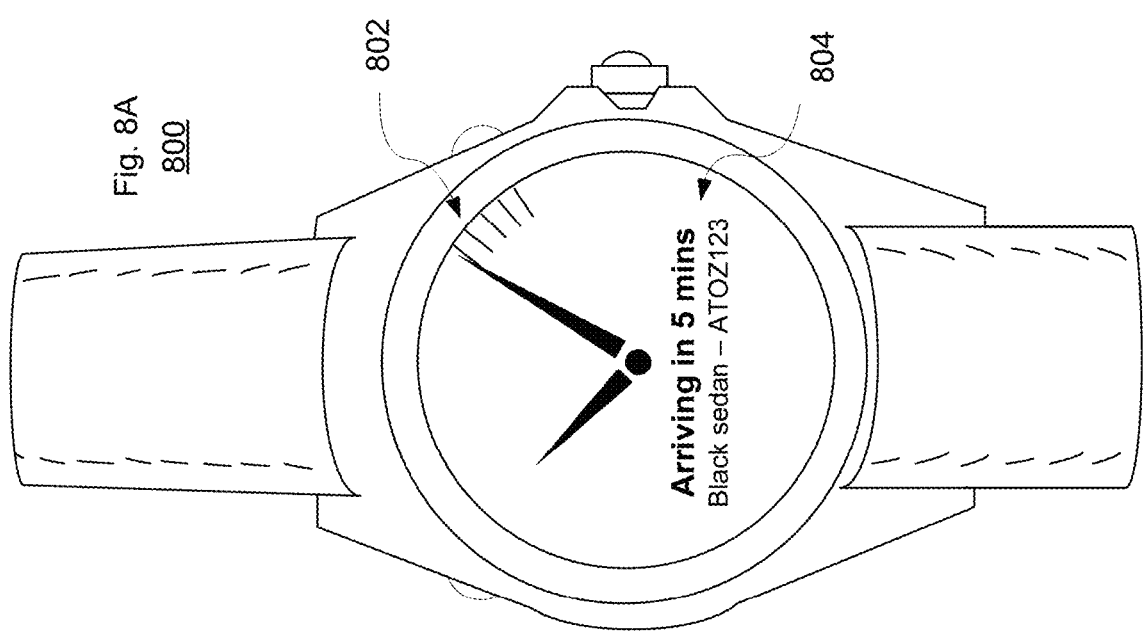
Figure 8D:
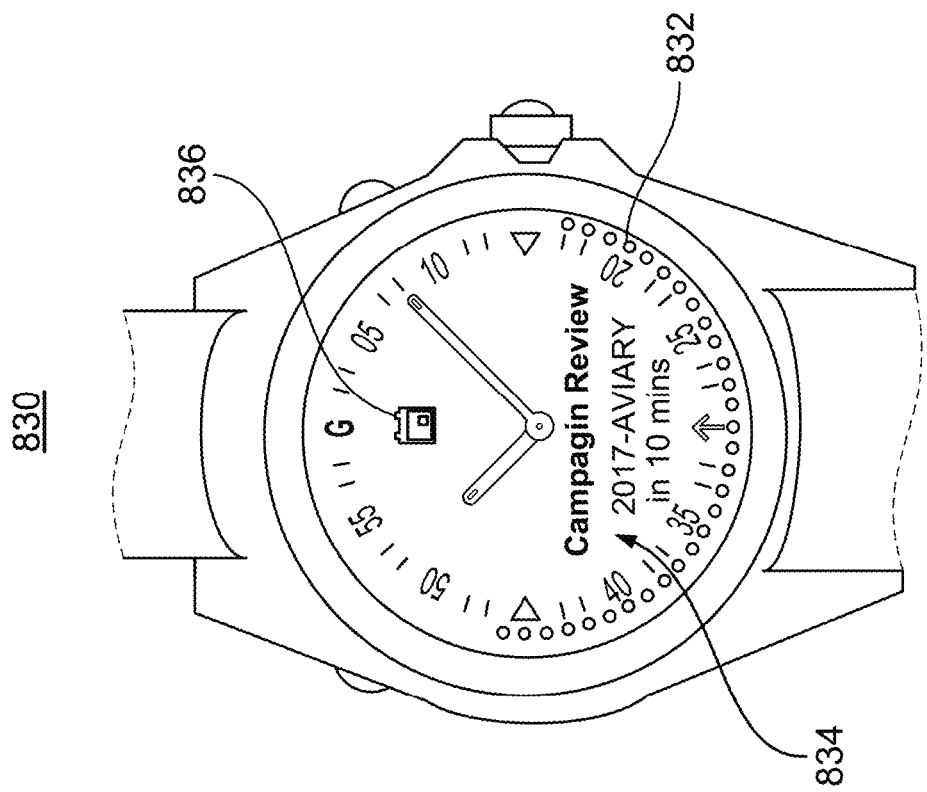
Figure 8C:
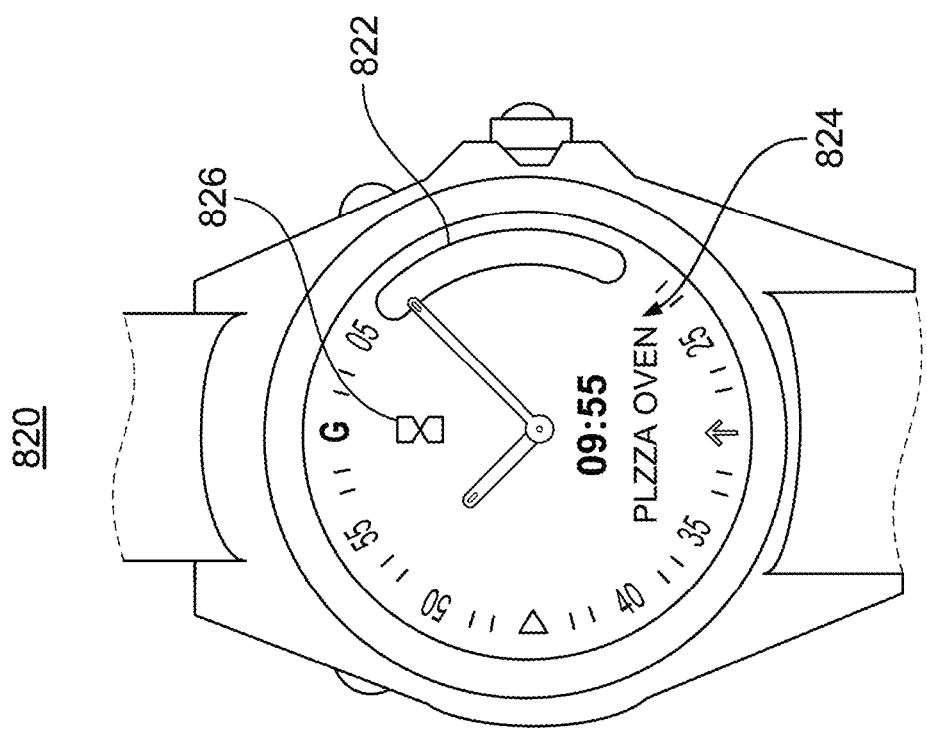

Other forms of displayed temporal information can relate to an alert, upcoming activity or other notification. For instance, FIG. 8A illustrates an alert 800 notifying the user that a pickup vehicle will be arriving in 5 minutes. Here, a series of tick marks 802 along an edge of the graphical display illustrate how much time until the arrival, and additional information 804, such as a text box, supplements the alert with specific details. FIG. 8B illustrates a notification 810 of an upcoming activity, such as a meeting. Here, a series of tick marks 812 indicates how long until the meeting, and additional information 814 provides details of the activity. Indication 816 may be used to show that this information is from the user's calendar. FIG. 8C illustrates a timer countdown notification 820. Here, the user may start a countdown on the hybrid watch or a different device, such as a phone, tablet, home-based device, etc. If the countdown is started on another device, it is then displayed on the hybrid watch. Here, countdown region 822 is highlighted, e.g., as an arcuate area along a side of the graphical display. Supplemental content 824 may also be provided as part of the notification, and an icon or other element 826 may indicate that a countdown is occurring. And FIG. 8D illustrates an example of an upcoming event notification 830. Here, when an upcoming event is scheduled to occur, e.g., within the next hour or more or less, the timeframe can be shown in relation to the watch hands, for instance via dots, tick marks or other indicators 832. As in FIG. 8D, supplemental content 834 may be provided as part of the upcoming event notification, and an icon or other element 836 may indicate that the event is scheduled to occur in the near future. In such scenarios, the visualization is relative to the physical watch hands. For instance, the watch hands are used to set the context and how the information—such as tick marks, countdown region or other indicators—is presented.

In conjunction with these examples, the watch hands can be fast-forwarded to a future time. The graphical display would then present relevant temporal information for that time, including activity information, when the user should leave to arrive on time, etc.

Figure 9C:
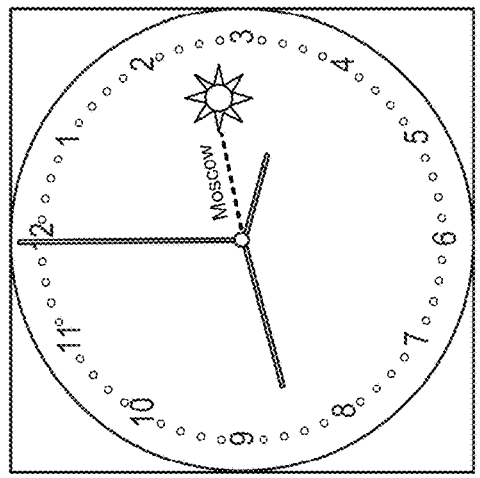
FIGS. 9A-9C illustrate an example of multi-location temporal information in accordance with aspects of the disclosure
Figure 9B:
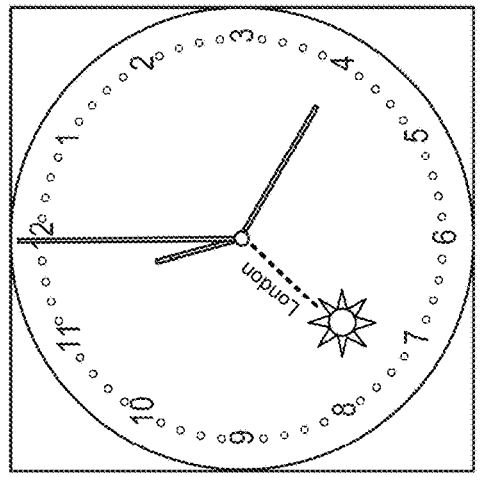
Figure 9A:
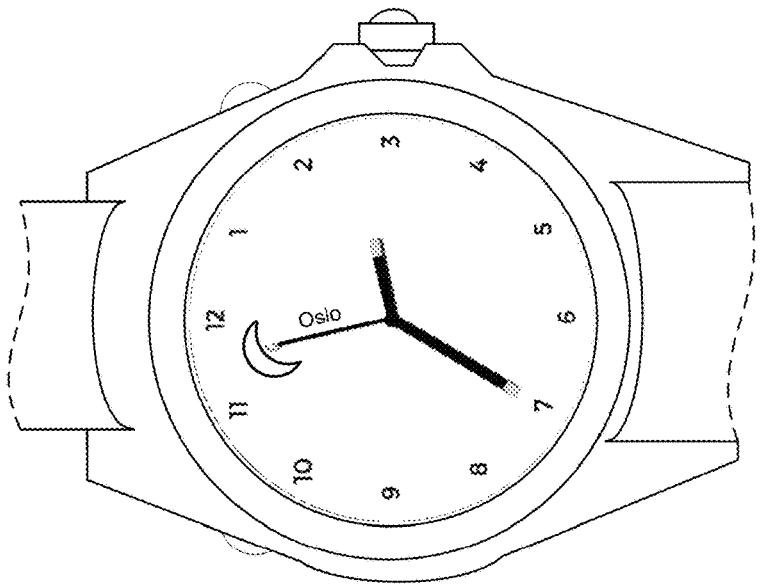

Another temporal feature that can be presented via the physical watch hands and the graphical display is information for different locations or time zones. For instance, FIG. 9A illustrates one example 900 in which the second hand or a graphically rendered hand on the graphical display is used to provide the time (hour) at another location while the minute and hour hands indicate the time at the current location. Here, the time in Oslo is shown concurrently with the local time. Also, a graphical element—here the moon phase—indicates that it is in the evening. Other graphical elements such as the sun or stars could be provided depending on the time at the other location. By way of example, FIGS. 9B and 9C illustrate a sun icon to indicate daytime in London and Moscow, respectively. Here, graphically rendered hands, shown in dashed lines, indicate the time at those other locations. In addition or in place of the time-based icon, one or more other icons may be presented. Examples of such icons include weather and air quality indicators, and sunrise or sunset time(s). The calendar or other availability of another person in the other location may also be provided. Thus, in this way the display may promote scheduling of voice or video-based communication with the other person because information about the time and conditions at the remote location are readily apparent on the watch's graphical display. Finally, as shown in FIGS. 9A-9C, the icon and textual location identifier are preferably not occluded by the watch hands, and so may be relocated as the hands move.

Figure 10A:
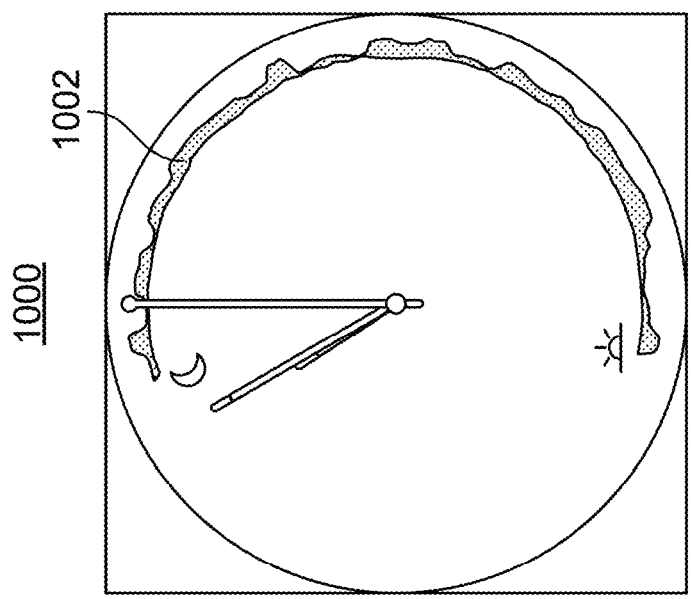
FIGS. 10A-D illustrate examples of biometric information in accordance with aspects of the disclosure.
Figure 10B:
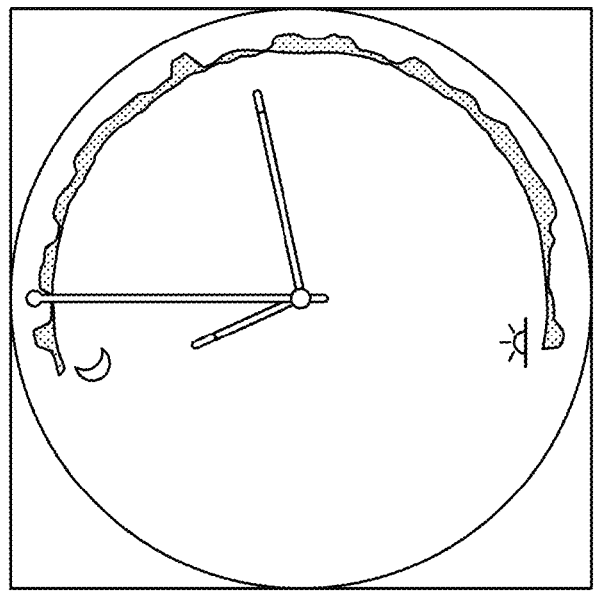

Additional temporal-related information that can be provided to the user includes biometric information. For instance, FIGS. 10A and 10B illustrate a scenario 1000 showing sleep-based data. Here, the start and end of the information traced along the outer arc 1002 correspond to the time period when the wearer was asleep. The relative height of the path at any given point along the arc 1002 may indicate, e.g., how much movement occurred, a depth of REM sleep, heart rate or other biometric measurements. The information along the outer arc may be retraced or updated as one or more of the second, minute or hour hands rotate around the watch face.

Figure 10C:
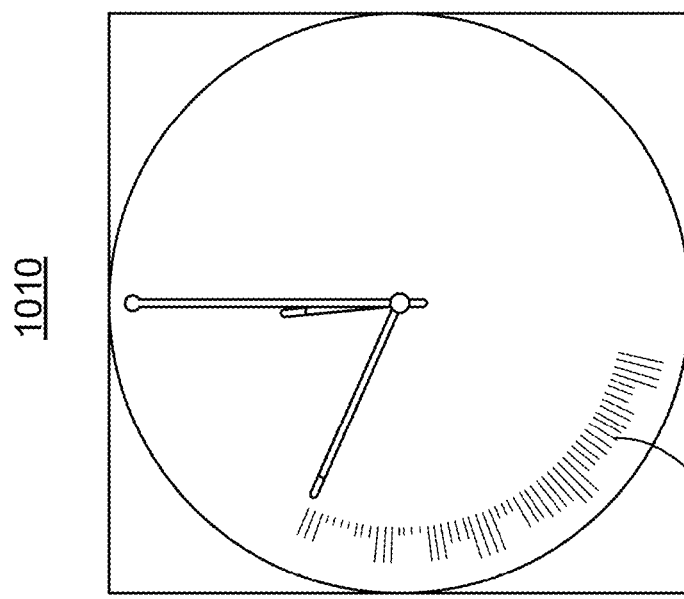
Figure 10D:
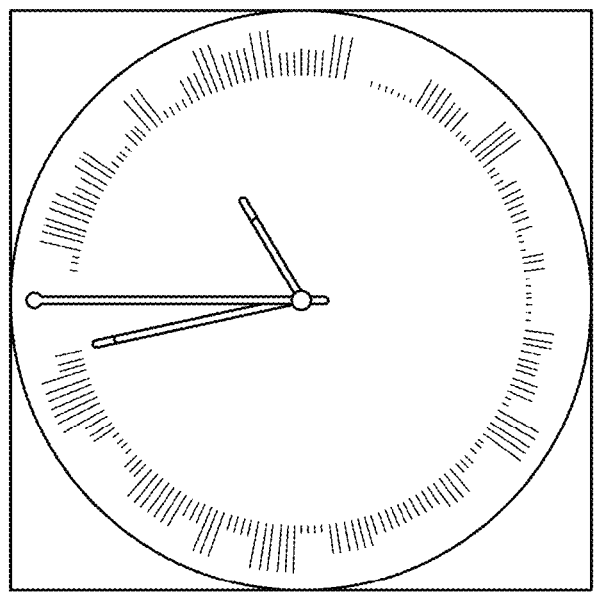

FIGS. 10C and 10D illustrate a different scenario 1010 showing activity-based data. Here, the start and end of the information traced along the outer arc 1012 correspond to the activity period. The relative height of the path at any given point along the arc 1012 may indicate the intensity of activity, number or pace of steps, heart rate or other biometric measures. The information along the outer arc may be retraced or updated as one or more of the second, minute or hour hands rotate around the watch face. For instance, as seen in these figures, the information is generated as the minute hand rotates in the clockwise direction. By way of example, the time scale may cover the past 15, 30 or 60 minutes, or more or less.

In addition to temporal information and notifications, the graphical display can also provide visual information that may be related to or disassociated from other content. By way of example, FIGS. 11A-11D illustrate various image types which can include graphical art. The imagery could be used to indicate the completion status of a project or activity. For instance, the imagery of FIGS. 11B and 11C could be used to indicate to the wearer that a given task, event or activity has just begun (FIG. 11B) or is nearly complete (FIG. 11C), such as by indicating how much of the display area is "filled", e.g., by a graphic that appears to be a liquid, sand, etc. Alternatively, such animations or other graphics can adapt to the position of the watch hands, for instance by rotating, reorienting, converging, aligning or otherwise adjusting to watch hand placement.

Further aspects of the technology relate to health and wellness information. This can include information about wellness generally, such as breathing exercises, attention and flow management, goal setting, habit tracking, mindfulness and/or screen/life balance. Fitness information can include daily or hourly progress meters, workout gauges, swimming or running lap detection, heart rate and other biometric monitoring, etc. And physical health information can include sleep tracking with a bedtime reminder, arrhythmia detection or clinical study integration. Examples of such information integrated into the hybrid user interface are shown in FIGS. 12A-12F.

Figure 12C:
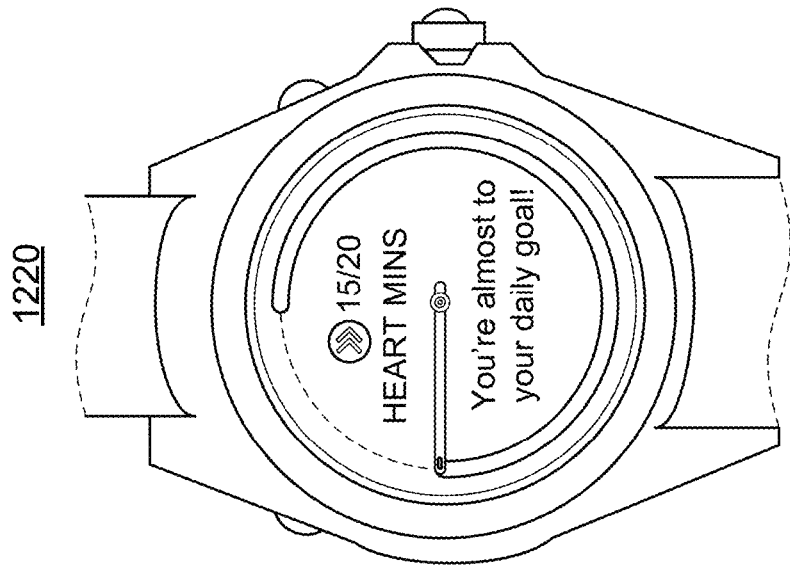
FIGS. 12A-12G provide examples of hybrid health and wellness displays in accordance with aspects of the disclosure.
Figure 12B:
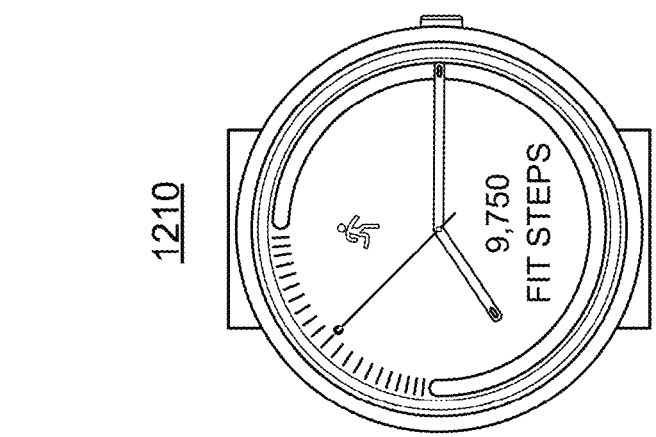
Figure 12A:
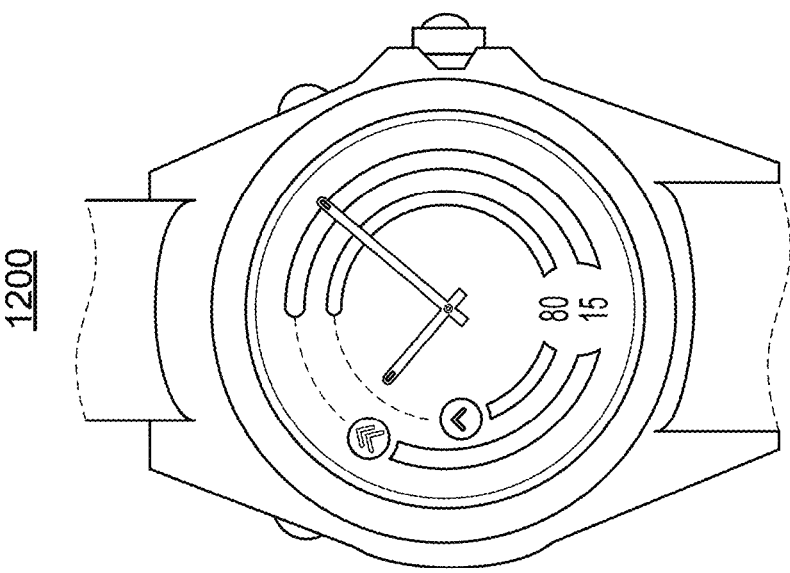

For instance, FIG. 12A illustrates an example 1200 of daily goals. As shown, one or more arcuate or circular indicators are arranged to provide current up to date progress and remaining objectives. Here, the outer and inner arcuate indicators may show a number of laps or reps, with or without numerical and/or icon-type indicia of current progress. The dashed lines indicate what still needs to be completed, and can give the wearer a quick visual on how much remains to be done. FIG. 12B illustrates another example 1210 of a goal for a given activity. Here, a single arcuate indicator shows progress, e.g., for a number of steps taken during the day. The solid arcuate line shows up-to-date progress and the tick marks/dashes show what remains or the goal, which can be daily, hourly, etc. A textual note is disposed along a lower region of the display area and an icon indicative of the type of activity is disposed along an upper region of the display area. The text and icon may be located in different positions along the display area to avoid occlusion by the watch hands.

Figure 12F:
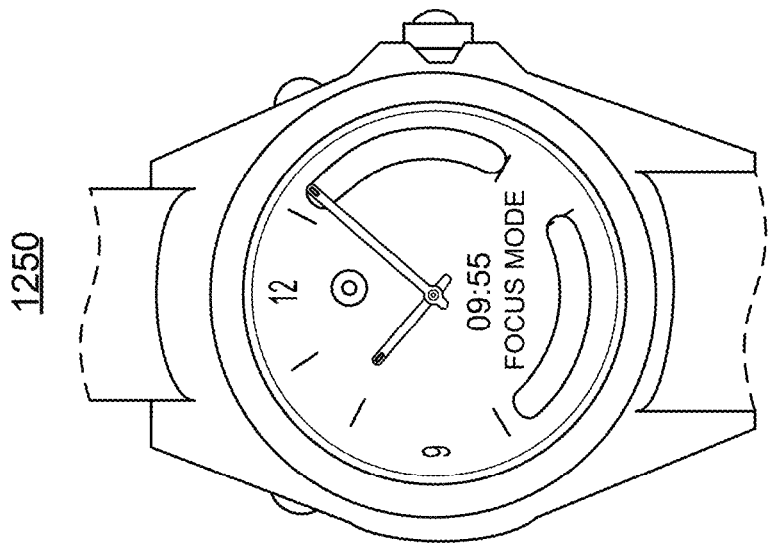

FIG. 12C illustrates a goal example 1220 for heart rate monitoring. In this case, the watch hand shows the current progress in conjunction with the arcuate line. Here, the hour and minute (and second) hands may be overlaid on top of one another to provide a 1D visualization. For instance, the physical hands can be "collapsed" together, e.g., using the micro-stepper motors, to "point" at elements on the graphical display. Such elements can be, as shown in the figures, a "target workout zone" or "percentage of a fitness goal". This example also includes textual and icon indicia to provide supplemental information, including motivation to achieve the goal. FIG. 12D illustrates another goal example 1230 for heart rate monitoring. The watch hand is used to provide status/progress information, motivational information, or other contextual information to complement the information presented on the graphical display.

Figure 12E:
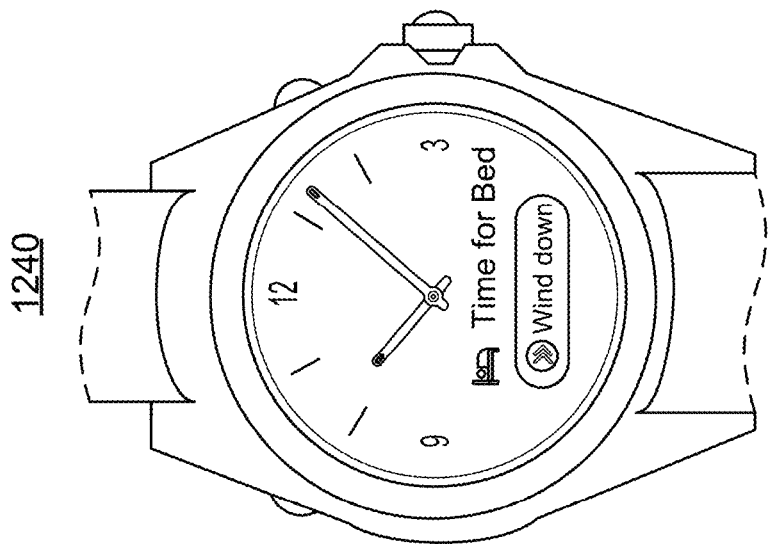
Figure 12D:
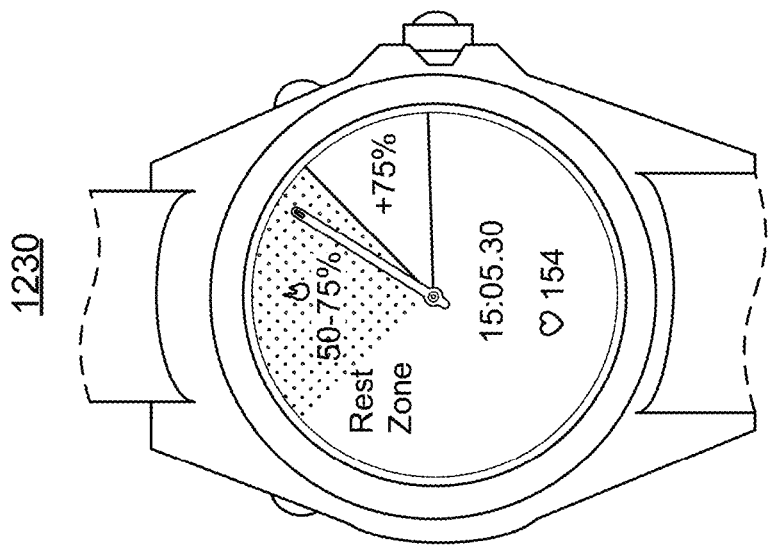

FIG. 12E illustrates a sleep tracking example 1240. Here, as the watch hands indicate the current time, the graphical display presents information to the wearer related to this, e.g., indicating that it is time to wind down and prepare for bed. This can provide a cohesive reminder and sleep tracking implementation, for instance in conjunction with the examples of FIGS. 10A-10B.

Figure 12G:
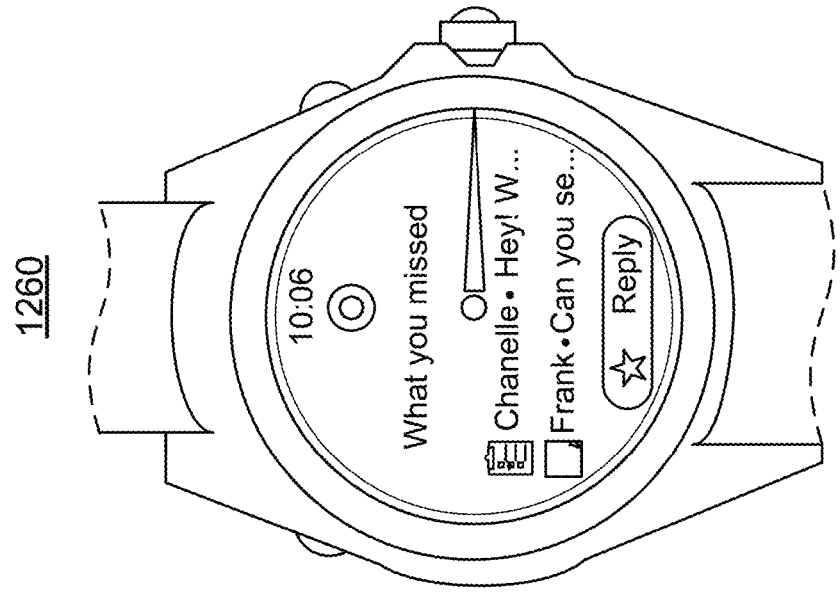

FIG. 12F illustrates a focus mode example 1250. Here, the graphical display and watch hands concisely provide relevant information and avoid unnecessary distractions, to help keep the wearer in the zone. In this type of mode, the user interface may silence or otherwise suppress some or all of the notifications, or may only present the highest alerts. The focus mode can be triggered when the smartwatch detects that the user has been distracted (e.g., overuse of a specific smartphone application based on time, activity or other limits the user has previously set for themselves), or if the smartwatch detects that the user has a break in their upcoming schedule/calendar that they can use to "focus". Additionally, at the end of the "focus session" the watch can provide a simplified "recap" of what the user missed while focusing. The graphical display may summarize the most relevant notifications and calls to action into a single view. FIG. 12G illustrates one example of a recap 1260 or other notification summary Shape-Shifting Analog Hands Scenarios Graphical analog watch hands on digital devices are generally employed as a skeuomorphic emulation of physical hands. One aspect of the technology is to utilize the steerable physical hands to take full advantage of their capabilities to also computationally control their movement or position. For instance, the processor(s), via the mechanical movement control subsystem, can control the hour, minute and/or second hands such that they can shape-shift between displaying information in a 2D arrangement or a 1D arrangement, such as by collapsing them into a single pointer. The pointer may be a linear pointer, on a tachymeter scale, etc.

The 2D information may be the current time (e.g., hour, minutes), an upcoming alarm (also in hours, minutes), and similar situations. The linear 1D information may include a timer (e.g., in minutes), step count (# of steps), an activity goal (% completion), a compass (direction relative to North or another orientation), etc. Some of these 1D examples are found in FIGS. 12C and 12D. FIG. 13A illustrates a compass example 1300, where the physical watch hands are aligned along a single direction to show true North. The graphical display presents contextual information for this 1D scenario, including the other cardinal directions, an indicator for the exact orientation (e.g., 293°), and latitude/longitude information.

Figure 13C:
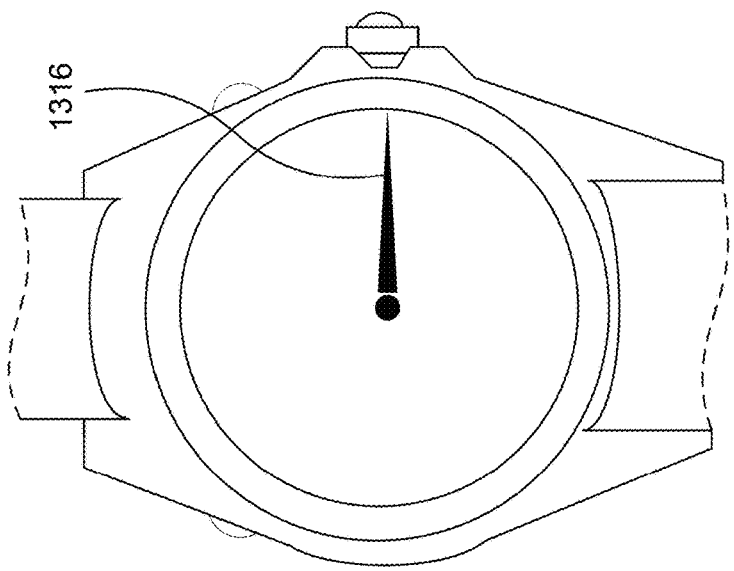
FIGS. 13A-13F provide examples of one-dimensional notifications in accordance with aspects of the disclosure.
Figure 13B:
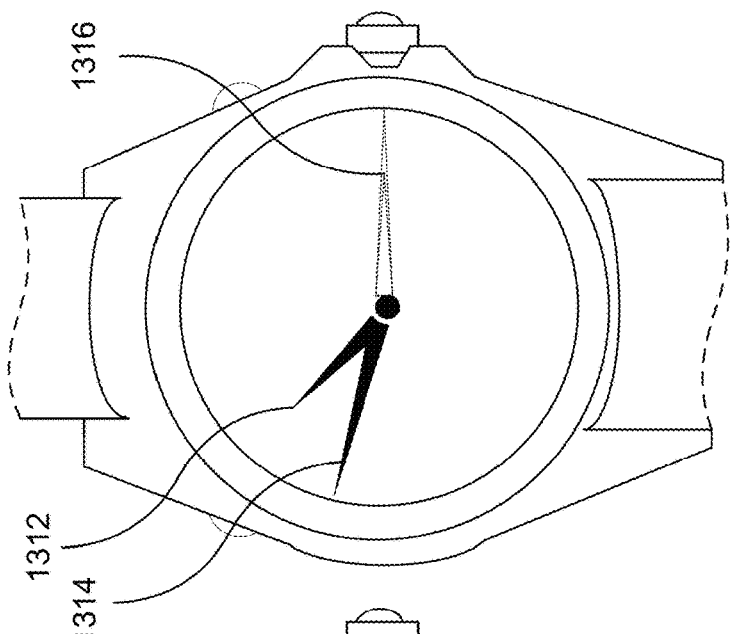
Figure 13A:
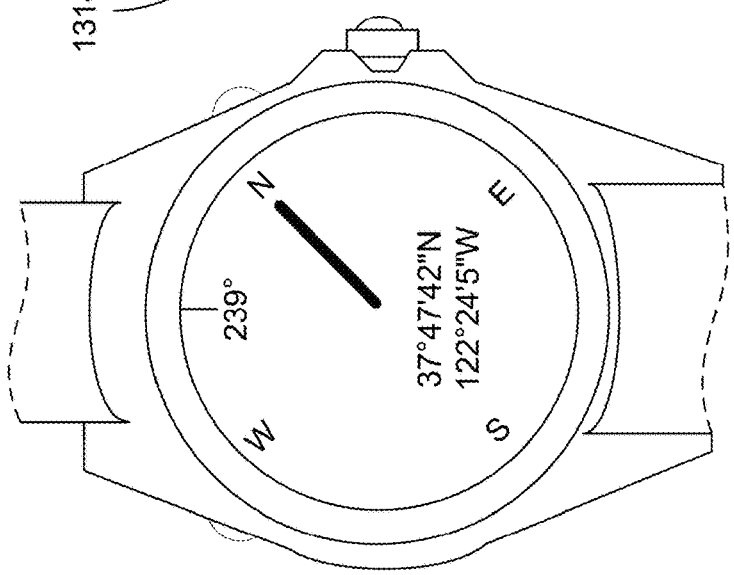

FIGS. 13B and 13C illustrate movement of the watch hands from a 2D positioning to a 1D positioning. In particular, FIG. 13B shows a snapshot 1310, in which the watch hands are in initial positions 1312 and 1314. They are rotated, either clockwise or counterclockwise, to a common 1D orientation 1316, as indicated by the dashed lines. FIG. 13C illustrates a snapshot 1320 that shows the watch hands at the common orientation. The common orientation is chosen in accordance with the type of information to be presented to the user.

Figure 13F:
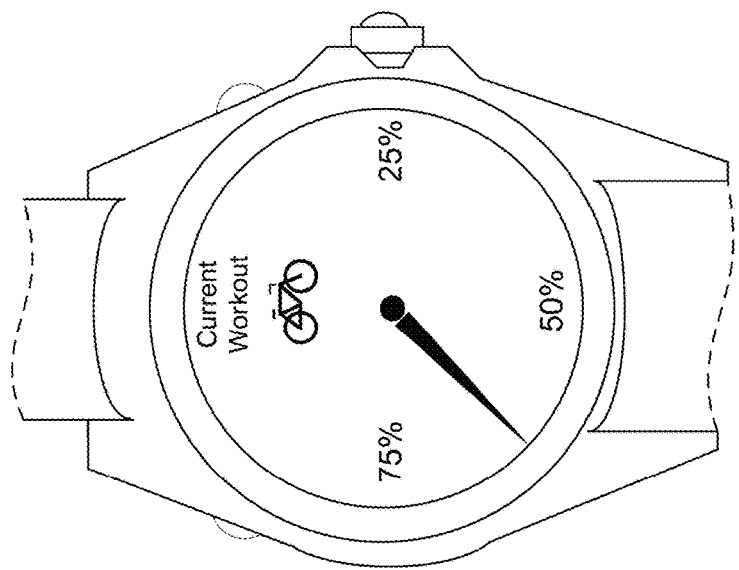
Figure 13E:
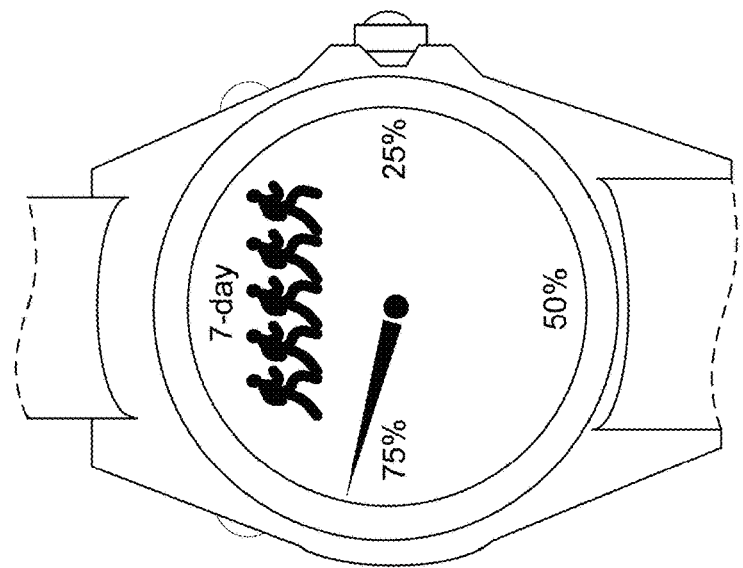
Figure 13D:
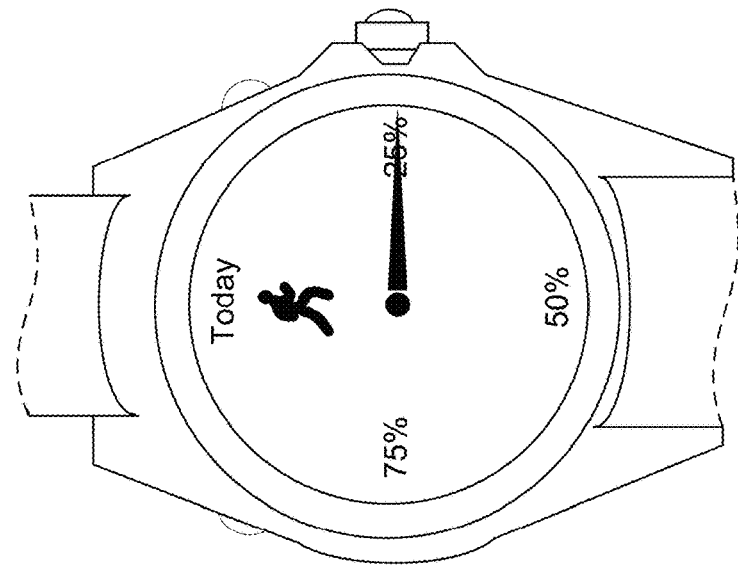

FIG. 13D illustrates a particular example 1330, showing walking or running progress. Here, the watch hands have been shifted to point to a percentage completion (e.g., 25%). An icon of a walker, jogger or runner indicates the type of activity, and the textual information provides context as to the timeframe (e.g., today). FIG. 13E illustrates another example 1340 of such exercise progress. In this case, the timeframe is different, e.g., one week as shown by the text. The icon also indicates the different timeframe, and the physical watch hand(s) point to the current progress. And FIG. 13F illustrates a further example 1350, showing progress for a current workout, for instance a spin class, road race or mountain bike excursion.

This approach, as shown by the examples of FIGS. 13A-13F, cooperatively distributes features of the user interface between the pixels of the graphical display and the physical watch hands.

Content-Aware Hybrid Layout

For devices that combine multiple display strategies in a single view, there are challenges with content placement to maintain clarity, avoid overlap, and ensure legibility. This is particularly relevant for hybrid watch user interfaces, where the mechanical hands are overlaid on a digital display. Depending on the content being displayed, the hands may obscure important or relevant information underneath. Aspects of the technology employ computational strategies to adapt the digital content based on the configuration of the elements on the screen, providing a dynamic relationship between the display screen and the data being presented.

For instance, the content may dynamically change position, scale and/or visual quality (e.g., contrast, brightness, color, saturation, opacity, etc.) based on predefined rules, which are informed by perceptual goals. These rules are developed to minimize the impact of overlap and improve legibility. The rules would may also be content-specific, to enable specific strategies to optimize text legibility versus image quality. The dynamic modifications of the content may also benefit from proximity to physical buttons or other physical constraints.

Re-configuration of content on the user interface can be triggered by various events and actions. For instance, an incoming notification or information may be pushed to the graphical display. Here, the user may tap the glass or plastic cover of the watch to read a notification. The user may scroll through content using an actuator, gesture, speech or visual cue. And in one example, the user may trigger the watch to display the full content of message by, for example, glancing at the watch for at least a predetermined period of time, e.g., 0.5 seconds, 1 second, 2 seconds or more or less.

Figure 14A:
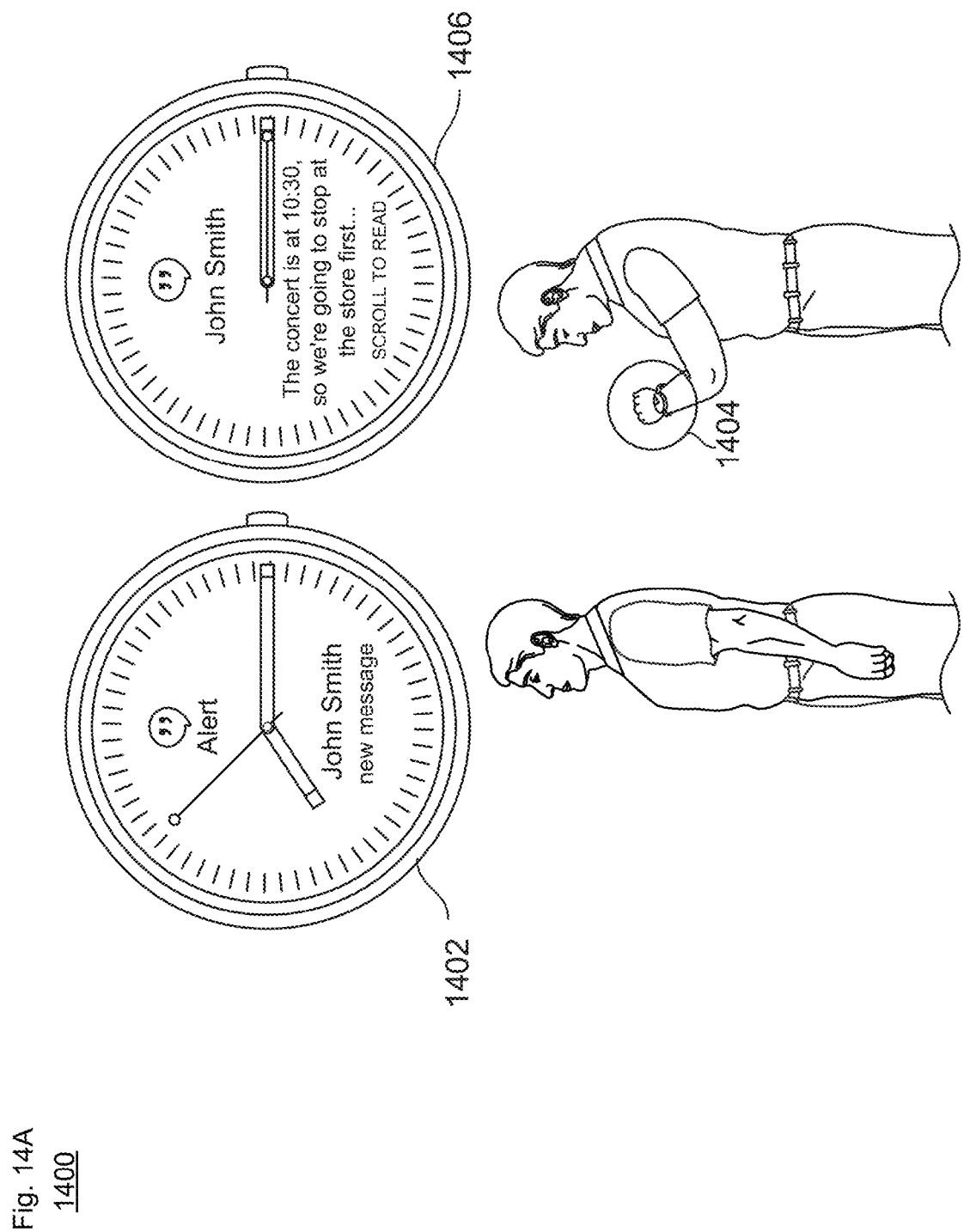
FIGS. 14A-D illustrate expanded notification examples in accordance with aspects of the disclosure.

FIG. 14A illustrates one way 1400 to present a notification or an alert to the wearer. Initially, the graphical display presents a first set of content 1402, which may include an alert about a new message. Then, as the user lifts up the arm to look at the watch at 1404, the graphical display presents a second set of content 1406 that provides specific information (e.g., a more detailed view) about the new message. Here, information can be revealed as user checks their device, leveraging sensor technology such as an on-board accelerometer, gyroscope or depth-sensing radar. This allows for long lists to be auto scrolled only while the user is looking at the hybrid smartwatch or otherwise appears to be interested in the content.

Figure 14B:
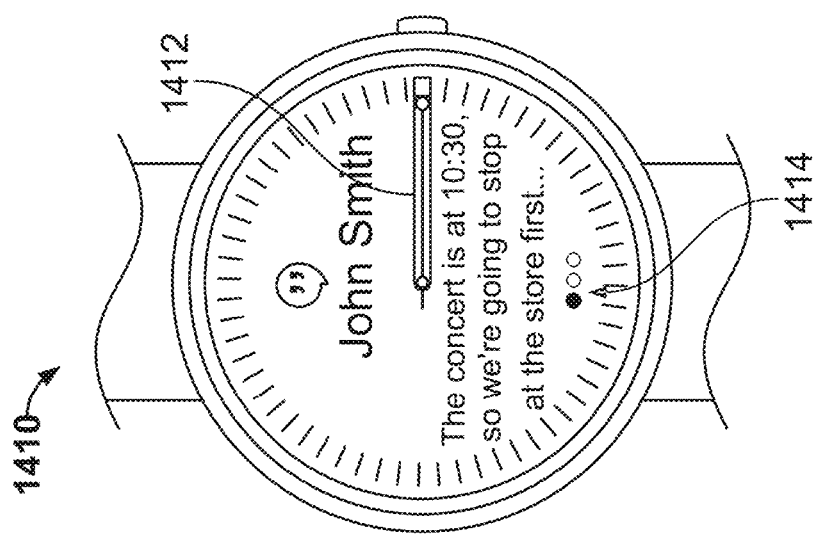
Figure 14C:
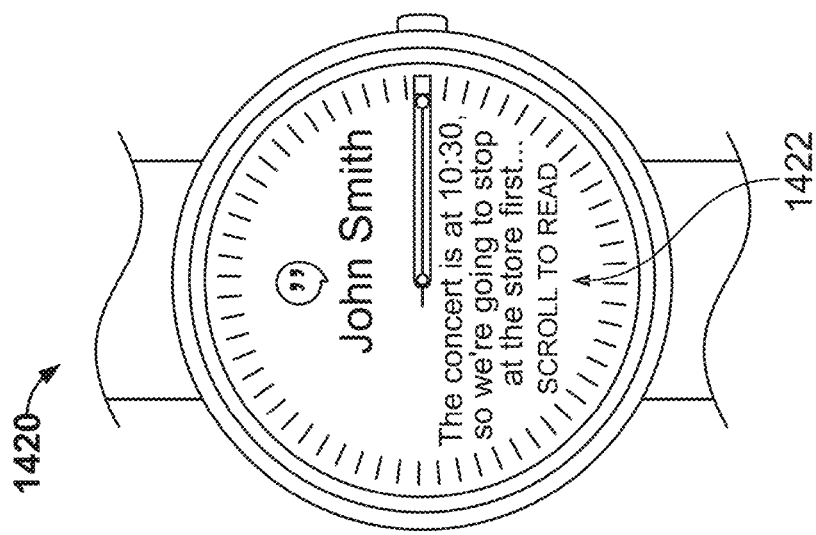
Figure 14D:
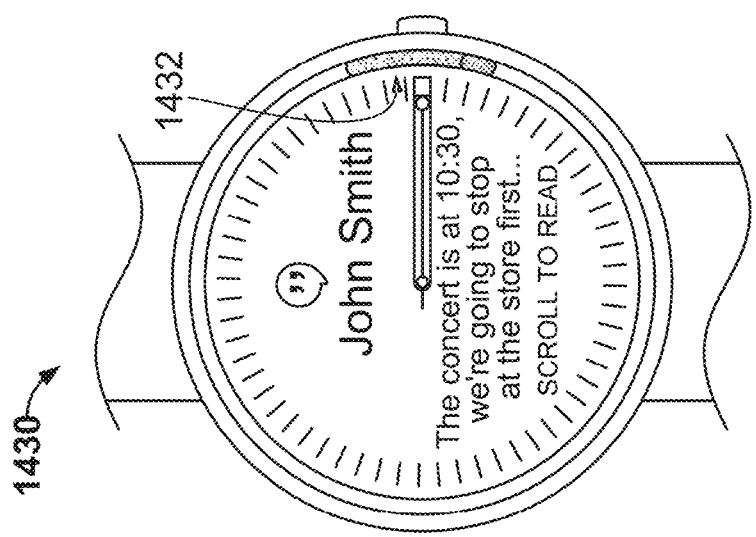

FIGS. 14B-14D illustrate three different approaches to information presentation once the user starts looking at the watch to read the notification. FIG. 14B shows a pagination view 1410. Here, the one or more watch hands are placed at a location 1412 that does not impede or otherwise interfere with the underlying message content on the graphical display. A plurality of dots or other indicators 1414 are presented to show the wearer that there is additional information to be viewed. This additional information may be accessed via activation of one of the physical or soft actuators, by gesture, voice, length of time looking at the screen, etc. FIG. 14C shows a short scroll view 1420. Here, a notification 1422 informs the user that additional information may be viewed, e.g., by scrolling the screen. And FIG. 14D shows a full scroll view 1430. Here, the notification informs the user that additional information may be viewed by scrolling. In this case, a graphical element 1432 can indicate a direction of scrolling, an amount of information to be scrolled, or other content-specific information.

These scenarios illustrate certain ways that the watch hands and graphical display can cooperatively work together to efficiently provide relevant content to the wearer. Additional scenarios include deictic referencing, prioritizing visual contents, prioritizing physical watch hands, intentional occlusion and appearance fusion. Each of these is discussed below.

Figure 15C:
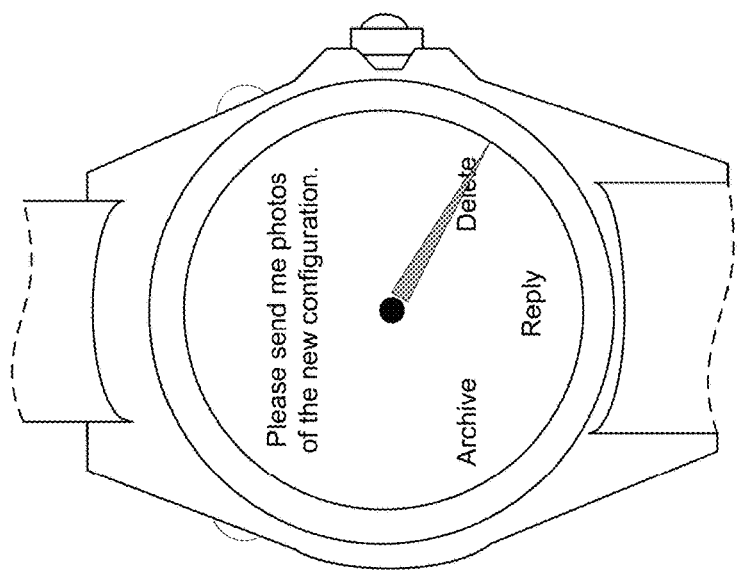
FIGS. 15A-15C illustrate examples of deictic scenarios in accordance with aspects of the disclosure.
Figure 15B:
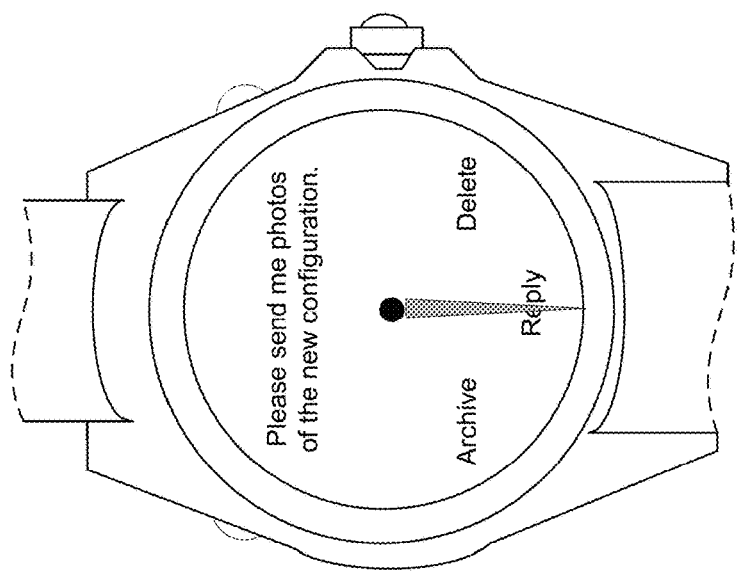
Figure 15A:
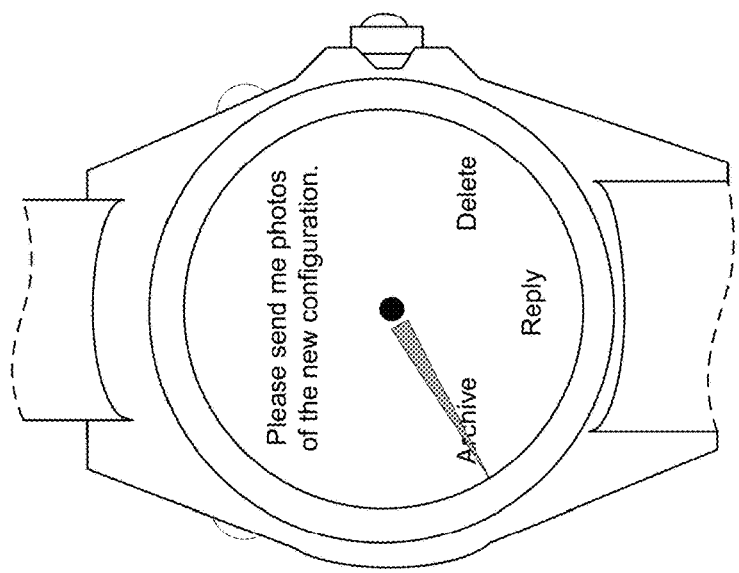

One important relationship between the physical watch hands and the graphical display of the hybrid user interface of the smartwatch is having the hand(s) point to a location on a visual scale or map, which is rendered by the dynamic digital display, to indicate a certain state. This makes it possible to communicate a context based on the tense, scale and/or type of information that the interface presents. FIGS. 15A-15C illustrate deictic scenarios 1500, 1510, 1520, in which a watch hand points to possible options to respond to a query, such as "Archive" the message (FIG. 15A), "Reply" to the message (FIG. 15B), or "Delete" the message (FIG. 15C). As shown, the physical watch hand can point to and/or cover a particular option. The wearer may select the given option or have the hand change to a different option by selecting an actuator, performing a swiping, tapping or other operation on the display, making a gesture or looking at a particular option on the display.

The prioritizing of visual contents may be achieved by selectively positioning the watch hands to avoid covering or otherwise interfering or distracting from the content on the graphical display. In situations where the user interface needs to display prioritized content, the watch hand can be moved out of the way, or collapsed, to minimize occlusion of the content. FIGS. 16A-16F illustrate various examples of prioritizing the content in a manner that is unimpeded by the watch hands.

Figure 16C:
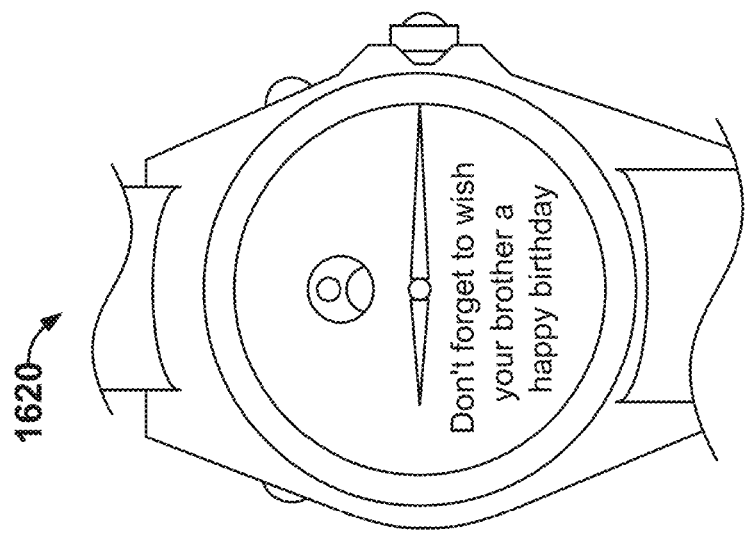
FIGS. 16A-16F illustrate examples of prioritizing visual content in accordance with aspects of the disclosure.
Figure 16B:
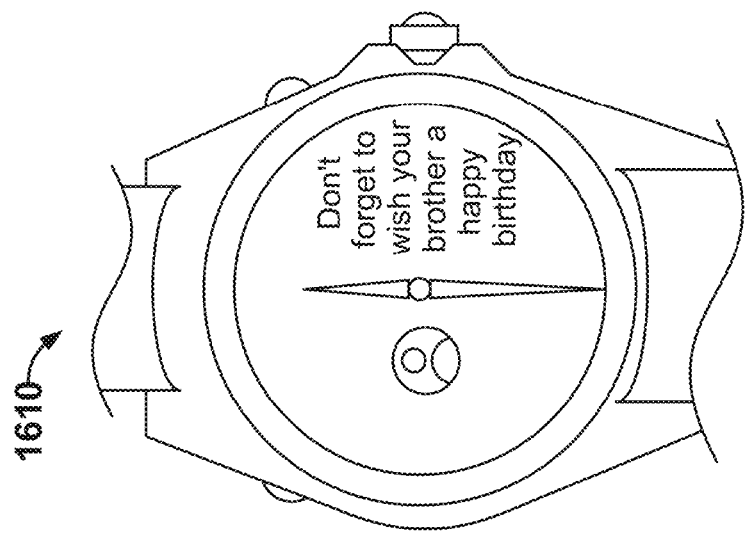
Figure 16A:
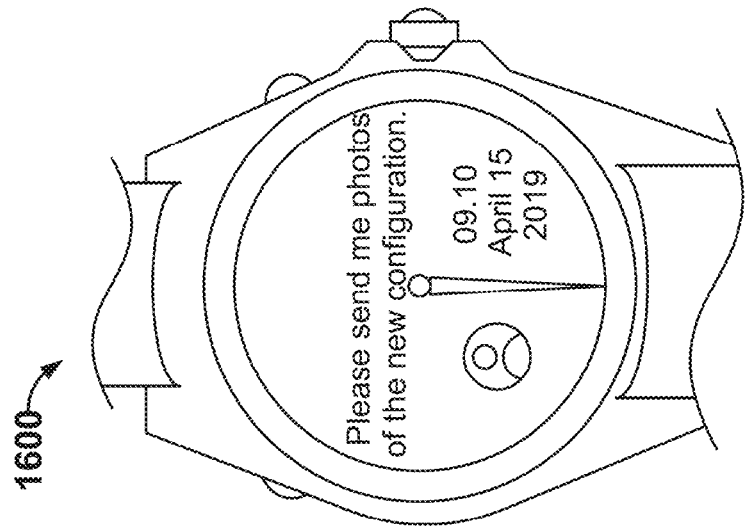
Figure 16F:
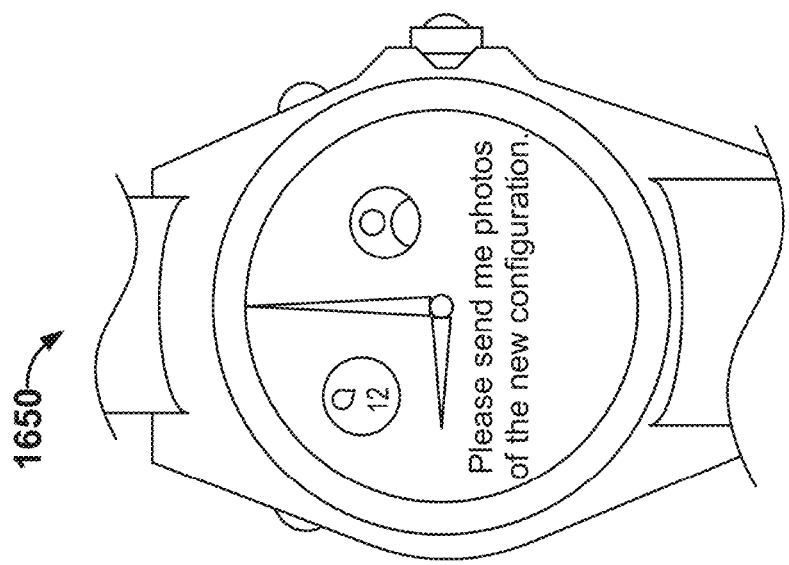
Figure 16E:
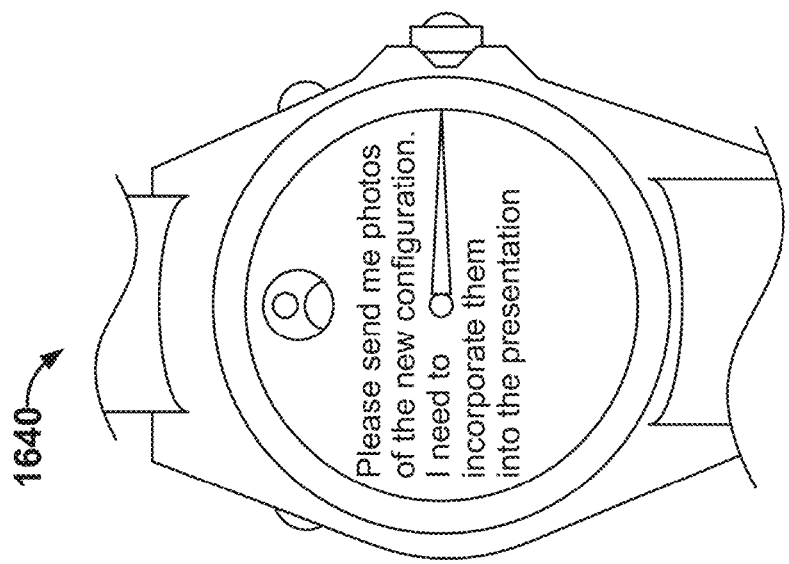
Figure 16D:
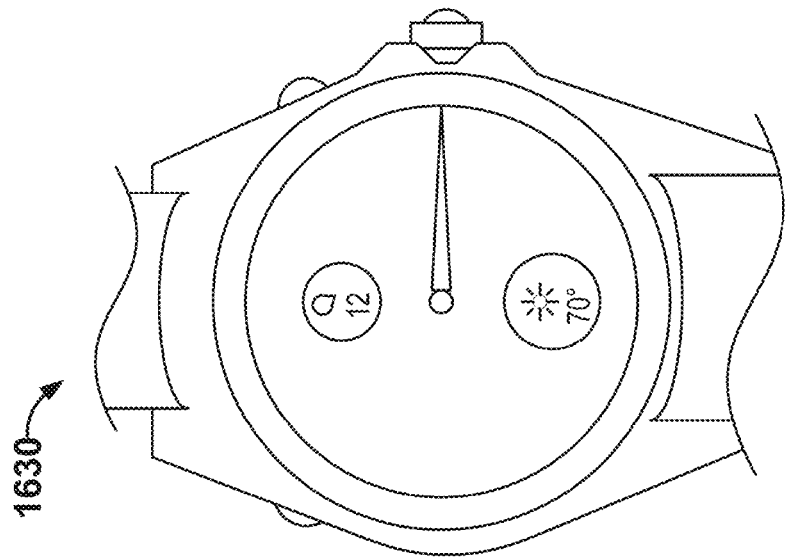

For instance, as shown in example 1600 of FIG. 16A, the watch hands are collapsed or otherwise folded together when text messages or emails are presented, such that the hour hand points to 6 and the minute hand points to 30 minutes, respectively. This creates a clear space along the top half of the display screen, with two vertically partitioned areas in the bottom half. Those lower areas may be used to display sender information and additional details as shown. FIG. 16B illustrates another example 1610, which uses both the hour and minute hands to split the display vertically. Here, the message may be presented on either the right or left hand side of the display, and other features such as an icon or photo may be presented on the other side of the display. FIG. 16C illustrates a further example 1620, which uses both the hour and minute hands to split the display horizontally. Here, the message may be presented on either the top or bottom side of the display, and other features such as an icon or photo may be presented on the other side of the display. FIG. 16D illustrates another example 1630 in which the content can be placed above and below the hand(s), which may point at around 3:15 or 9:45 on the watch face, or at some other orientation. The content may also "float around" the watch hand, as shown in example 1640 of FIG. 16E. And FIG. 16F shows yet another example 1650, in which the watch hands may be placed perpendicular or at some other non-zero angle relative to one another, for instance to appear to physically separate certain content items from others.

Other scenarios involve prioritizing the physical watch hands over the content on the graphical display. In particular, it may be important to preserve the position of the hands while presenting prioritized contents on the dial. This could be used when displaying notifications while the hands are showing the time. The one or more processors may select a suitable location on the dial for each notification icon, for example, based on the amount of un-occluded space. The graphical display enables the system to position contents anywhere on the dial in a single operation, whereas adjustment of the hands may require repeated pulses to move between positions. So in the examples of FIGS. 16A-16F, instead of moving the watch hands to avoid the content, the content may be arranged in such locations to avoid the watch hands.

In contrast to these approaches, the system may leverage the overlaid hands for intentional occlusion of on-screen elements in other scenarios. This technique may be utilized to address limitations of the chosen display screen technology, such as refresh rate or transition quality, by using the hands to temporarily "hide" elements on the graphical display by partially or fully obstructing them. A static screen could thus be used, where the hand "updates the UI" by moving between the occlusion of all options except one. Another possibility is to use the hand to occlude a part of the screen that is being updated, in cases where transition speed is limited. After the transition is completed, the hand moves away. This could, e.g., be implemented as hands swiping over the area being updated. These approaches can reduce the need to perform screen updates, for instance when the graphical display screen is an E-ink screen. This saves power consumption and minimizes transition artifacts.

Figure 17B:
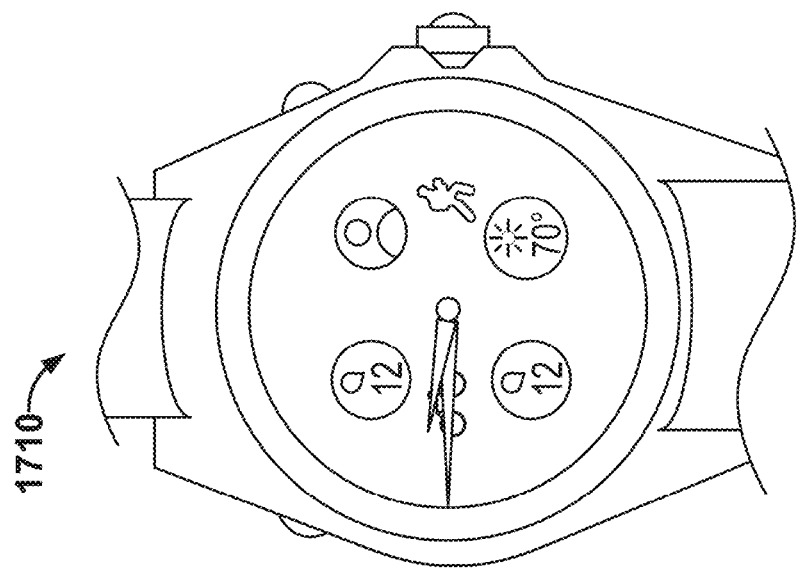
FIGS. 17A-17B illustrate intention occlusion in accordance with aspects of the disclosure.
Figure 17A:
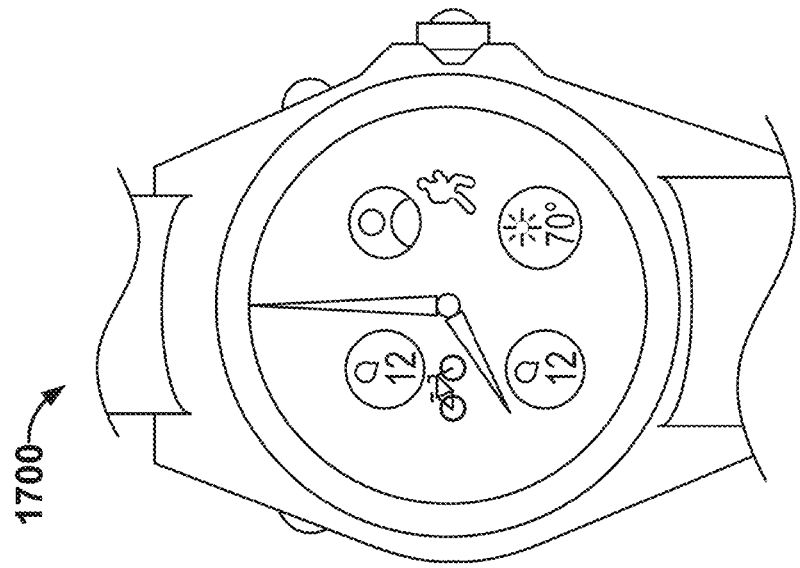

FIGS. 17A and 17B illustrate one example of intentional occlusion. FIG. 17A illustrates a first arrangement 1700, where a plurality of icons or other items are disposed about the graphical display. FIG. 17B illustrates a second arrangement 1710. Here, both the hour and minute hands are used to occlude one of the icons. Depending on the size and shape of the item of content and the size, shape and number of hands, the occlusion may be complete or partial. For instance, the partial occlusion may be more than 90%, between 50-85%, at least 25%, or no more than 40%. The time of occlusion may vary. For instance, it may depend on how long the screen update takes, whether the hands are in clock mode, etc.

Another set of scenarios that marry the physical watch hands and graphical display involves user interface "fusion". For instance, certain user interface elements can be constructed by aligning the hands with rendered shapes, such that they become part of the geometry. This can be achieved through the blending of physical and visual elements. It can also be used to let graphics interact with the physical hands, and vice versa. For technologies like E-ink, it is particularly useful to match the physical hands with the limited range of greyscales they support, and the limited white and black levels of the pigments.

Figure 11D:
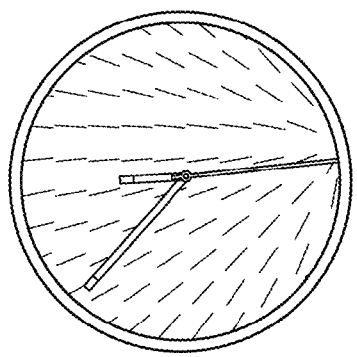
FIGS. 11A-11D provide graphical examples in accordance with aspects of the disclosure.
Figure 11C:
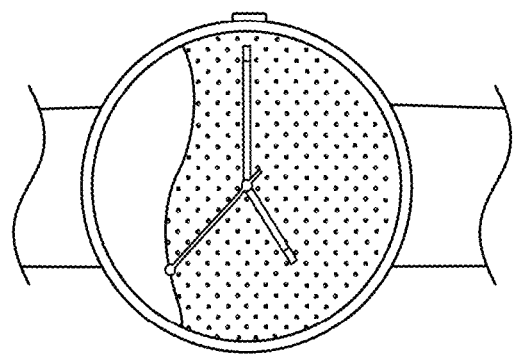
Figure 11B:
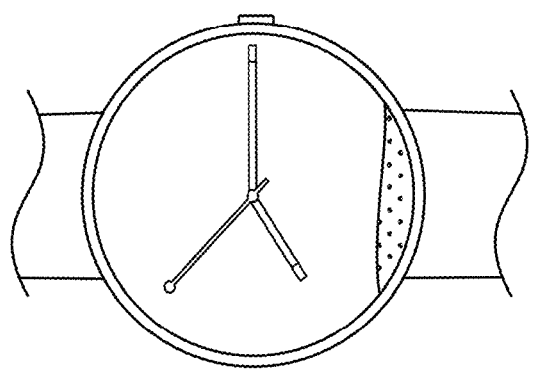
Figure 11A:
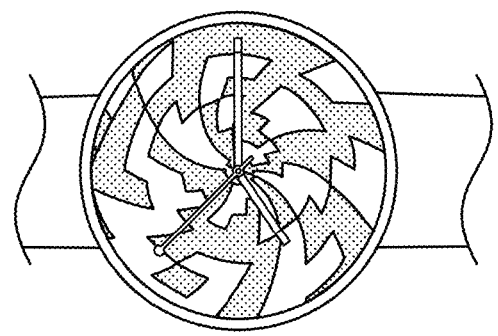
Figure 18A:
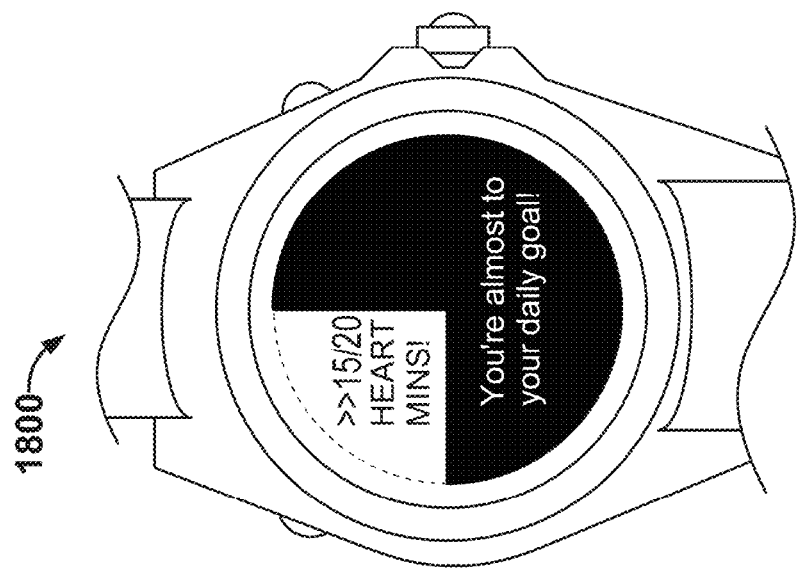
FIGS. 18A-18D illustrate graphical display and physical watch hand fusion in accordance with aspects of the disclosure.
Figure 18D:
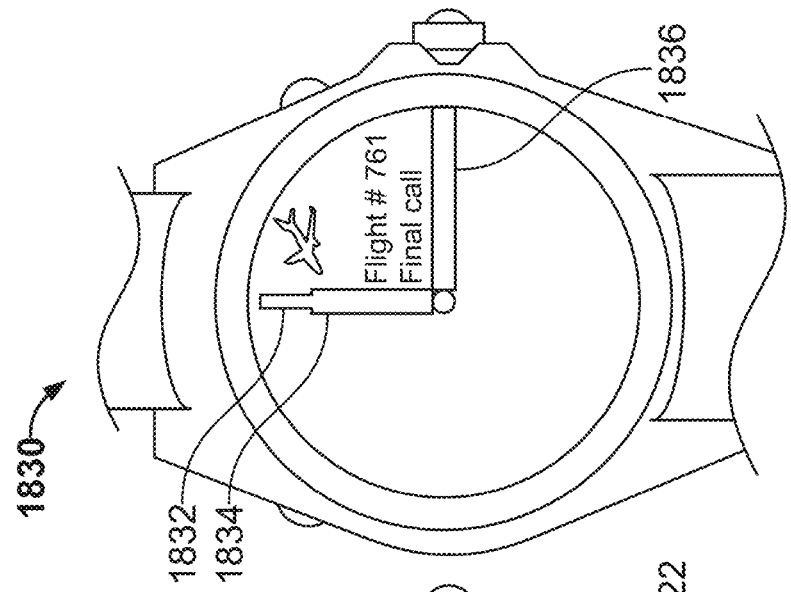
Figure 18C:
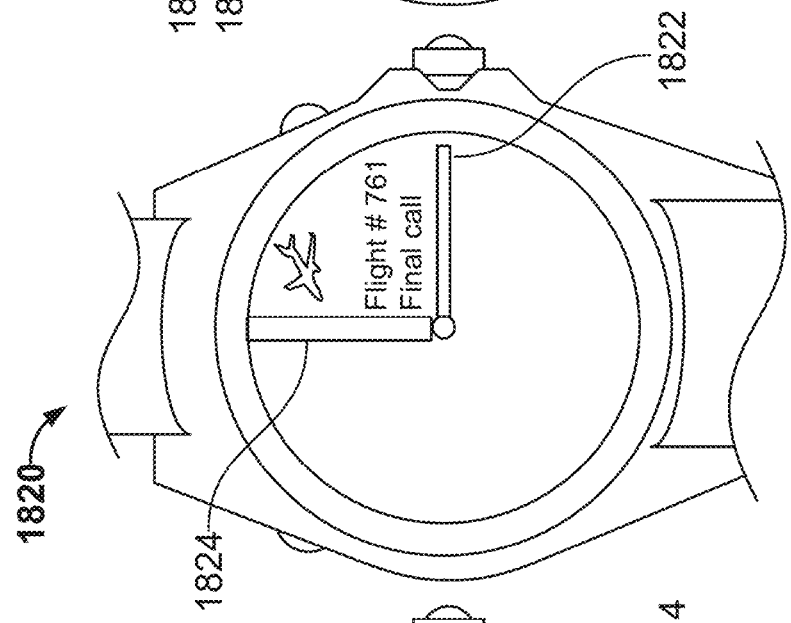
Figure 18B:
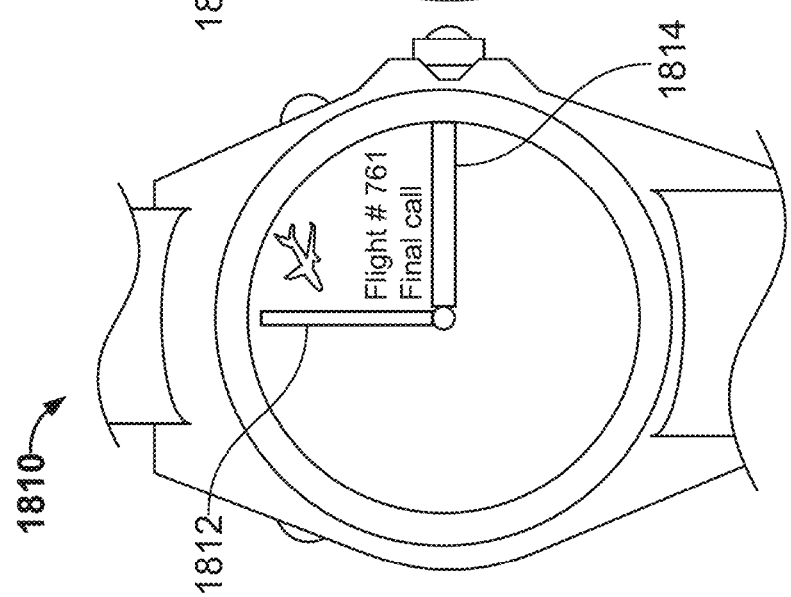

Some such examples are seen in FIGS. 11A and 11C, where the black or black and white patterns on the graphical display match or blend with the watch hands. FIG. 18A illustrates a variation 1800 of FIG. 12C. Here, the graphical display has an inner portion that is shaded to match the color of the watch hands, so that most or all of each hand seems to disappear. FIGS. 18B-18D illustrate other scenarios where parts of the graphical display mimic the appearance of the hand(s). For instance, as seen in example 1810 of FIG. 18B, virtual hand 1812 is vertically placed, while actual hand 1814 is horizontally placed. In example 1820 of FIG. 18C, virtual hand 1822 is horizontally placed, while actual hand 1824 is vertically placed. Of course, other positions anywhere along the watch face from 0-360° may be employed for such scenarios. And in example 1830 of FIG. 18D, virtual hand 1832 is provided beneath actual hand 1834 (e.g., the hour hand) to make the actual hand appear longer. Another actual hand 1836 (e.g., the minute hand) may also be disposed on the watch face in a different location, e.g., perpendicular to the hands 1832 and 1834. These examples show how edges of similar shape and intensity as the physical hands can be used as part of the geometry on the graphical display, to provide hybrid visualizations.

For any of the above-identified examples, during an alert or notification, the system is able to select one or more strategies to optimize the location for new or existing content or other information to be displayed or otherwise arranged on the graphical display. In one example, the content may be placed as close to the vertical or horizontal axis of the graphical display as possible, while taking into account the amount of surrounding empty space. Content items may be arranged to appear to be evenly spaced, and may also be positioned no fewer (or no more) than a predetermined number of pixels on the display, e.g., 5-10 pixels or more or less. Alternatively or in addition, a default may be to place a new item of content away from the hour hand (e.g., 10-20 pixels or more) to avoid long periods of occlusion. In contrast, such content may be placed closer to the minute hand, as a potential partial occlusion may be resolved more quickly. Different rules may be employed for different types of content, such as text, icons, images or photographs, videos, audio indicators, etc. Such rules can factor in the size of the item of interest, how long it will be displayed, its color(s) and those of the watch hands, and the like.

Aspects of the technology evaluate content and other information to be displayed, as well as the number and position of the watch hands, to provide various types of hybrid visualizations between the graphical display and the watch hands. Temporal information may be presented using an array of techniques that depend on the content, time scale, user preferences, location information and other factors. The watch hands can shape-shift to highlight content, be used to select answers to questions, and otherwise change the user interface from a 2D display to a linear 1D display. In addition, numerous types of content-aware layouts may be employed with the physical hands and (virtual) display to highlight, bracket, occlude or otherwise emphasize or deemphasize displayed information. These approaches provide a rich toolkit that allows the system to provide meaningful content to the user in a manner that can be tailored to the user's preferences while being unobtrusive to others.

Depending on the specific arrangement, an emissive display, such as an OLED or LCD-type screen, may be employed instead of a non-emissive display.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computing device comprising:
    a display;
    one or more watch hands disposed above the display; and
    one or more processors configured to:
        generate one or more display elements on the display;
        transition a first display element of the one or more display elements to an updated first display element;
        during the transition, adjust the one or more watch hands to at least partially occlude the first display element; and
        after the transition, adjust the one or more watch hands to not occlude the updated first display element,
        wherein a length of time between adjusting the one or more watch hands to at least partially occlude the first display element and adjusting the one or more watch hands to not occlude the updated first display element is based on a length of time of the update of the first display element.

2. The computing device of claim 1, wherein the display is an electrophoretic display.

3. The computing device of claim 1, wherein the one or more processors are configured to adjust the one or more watch hands to at least partially occlude the first display element based on one or more of a refresh rate of the display and a transition quality of the transition between the first display element and the updated first display element.

4. The computing device of claim 3, wherein the transition quality is based on one or more of a length of time to transition from the first display element to an updated first display element, and a presence of transition artifacts on the display while updating the first display element.

5. The computing device of claim 1, wherein the one or more processors are configured to cause the one or more watch hands to swipe over the first display element while updating the first display element.

6. The computing device of claim 1, wherein the one or more display elements comprise a plurality of elements each corresponding to a respective option of a user interface; and
    wherein the one or more processors are further configured to adjust the one or more watch hands to at least partially occlude all but one of the plurality of elements.

7. The computing device of claim 6, wherein the one or more processors are configured to adjust the one or more watch hands to at least partially occlude different elements of the plurality of elements in response to input to the computing device.

8. A system comprising:
    one or more processors configured to:
        generate one or more display elements on a display of a computing device comprising one or more watch hands;
        transition a first display element of the one or more display elements to an updated first display element;
        during the transition, adjust the one or more watch hands to at least partially occlude the first display element; and
        after the transition, adjust the one or more watch hands to not occlude the updated first display element,
        wherein a length of time between adjusting the one or more watch hands to at least partially occlude the first display element and adjusting the one or more watch hands to not occlude the updated first display element is based on a length of time of the update of the first display element.

9. The system of claim 8, wherein the display is an electrophoretic display.

10. The system of claim 8, wherein the one or more processors are configured to adjust the one or more watch hands to at least partially occlude the first display element in accordance with one or more of a refresh rate of the display and a transition quality of the transition between the first display element and the updated first display element.

11. The system of claim 10, wherein the transition quality is based on one or more of a length of time to transition from the first display element to an updated first display element, and a presence of transition artifacts on the display while updating the first display element.

12. The system of claim 8, wherein the one or more processors are configured to cause the one or more watch hands to swipe over the first display element while updating the first display element.

13. The system of claim 8, wherein the one or more display elements comprise a plurality of elements each corresponding to a respective option of a user interface; and
    wherein the one or more processors are further configured to adjust the one or more watch hands to at least partially occlude all but one of the plurality of elements.

14. The system of claim 13, wherein the one or more processors are configured to adjust the one or more watch hands to at least partially occlude different elements of the plurality of elements in response to input to the computing device.

15. A method comprising:
    generating, by one or more processors, one or more display elements on a display of a computing device comprising one or more watch hands, the one or more display elements each comprising a respective notification;
    transitioning, by the one or more processors, a first display element of the one or more display elements to an updated first display element;

during the transition, adjusting, by the one or more processors, the one or more watch hands to at least partially occlude the first display element; and after the transition, adjusting, by one or more processors, the one or more watch hands to not occlude the updated first display element, wherein a length of time between adjusting the one or more watch hands to at least partially occlude the first display element and adjusting the one or more watch hands to not occlude the updated first display element is based on a length of time of the update of the first display element.

\* \* \* \* \*